(12) United States Patent
Ilic et al.

(10) Patent No.: US 11,223,206 B2
(45) Date of Patent: Jan. 11, 2022

(54) METHODS AND SYSTEMS FOR SECURE SCHEDULING AND DISPATCHING SYNTHETIC REGULATION RESERVE FROM DISTRIBUTED ENERGY RESOURCES

(71) Applicant: Massachusetts Institute of Technology, Cambridge, MA (US)

(72) Inventors: Marija D. Ilic, Sudbury, MA (US); Rupamathi Jaddivada, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 469 days.

(21) Appl. No.: 16/206,009

(22) Filed: Nov. 30, 2018

(65) Prior Publication Data
US 2019/0173286 A1 Jun. 6, 2019

Related U.S. Application Data

(60) Provisional application No. 62/593,324, filed on Dec. 1, 2017.

(51) Int. Cl.
*H02J 3/00* (2006.01)
*H02J 3/38* (2006.01)
(Continued)

(52) U.S. Cl.
CPC ........ *H02J 3/381* (2013.01); *G06Q 10/06315* (2013.01); *G06Q 40/04* (2013.01);
(Continued)

(58) Field of Classification Search
CPC .. H02J 3/381; H02J 3/008; H02J 3/003; H02J 13/0006; H02J 13/0017; H02J 2203/20;
(Continued)

(56) References Cited

U.S. PATENT DOCUMENTS

2014/0343984 A1  11/2014  Shahabi et al.
2015/0039145 A1  2/2015  Yang et al.
(Continued)

OTHER PUBLICATIONS

PCT International Search Report and Written Opinion dated Feb. 5, 2019 for International Application No. PCT/US2018/063239; 20 Pages.
(Continued)

*Primary Examiner* — Gary Collins
(74) *Attorney, Agent, or Firm* — Daly, Crowley, Mofford & Durkee, LLP

(57) ABSTRACT

Embodiments of the disclosure relate to methods and systems for modeling, controlling and computer-platform implementation of a Synthetic Reserve Provisioning System (SRPS) needed to aggregate and integrate small devices closer to consumers, referred to as Distributed Energy Resources (DERs). This know-how is based on data-driven physics-based modeling and it supports the dispatch and scheduling of DERs so that they can participate in system level provision of electricity service. An SRPS generally comprises multiple levels of consumer aggregators (Synthetic Reserve Provisioning (SRP) modules) which interact by exchanging well-defined information about provable consumer characteristics and their own loading and pricing conditions. Three different SRPS designs are described. They differ with respect to implementation requirements for communications, control, technical and economic risks assumed by different SRP modules. Depending on the control and available communication architecture, it is ultimately possible to ensure DER integration at value, even with a limited number of participating devices.

21 Claims, 10 Drawing Sheets

(51) Int. Cl.
  H02J 13/00     (2006.01)
  G06Q 10/06     (2012.01)
  G06Q 50/06     (2012.01)
  G06Q 40/04     (2012.01)
(52) U.S. Cl.
  CPC .............. *G06Q 50/06* (2013.01); *H02J 3/008* (2013.01); *H02J 13/0006* (2013.01); *H02J 13/0017* (2013.01); *H02J 3/003* (2020.01); *H02J 2203/20* (2020.01)
(58) Field of Classification Search
  CPC ... G06Q 10/06315; G06Q 40/04; G06Q 50/06
  See application file for complete search history.

(56) References Cited

U.S. PATENT DOCUMENTS

| | | | |
|---|---|---|---|
| 2016/0042377 A1* | 2/2016 | Ilic | G06Q 40/04 705/7.35 |
| 2017/0322578 A1* | 11/2017 | Baone | H02J 3/38 |
| 2018/0082385 A1 | 3/2018 | Frolik et al. | |

OTHER PUBLICATIONS

International Preliminary Report on Patentability dated Jun. 11, 2020 for International Application No. PCT/US2018/063239; 15 Pages.
ARPA-E, "Network Optimized Distributed Energy Systems (NODES);" Retrieved from https://arpa-e.energy.gov/?q=arpa-e-programs/nodes; Released Dec. 11, 2015; 1 Page.
Donadee, "Operation and Valuation of Multi-Function Battery Energy Storage under Uncertainty;" PhD Dissertation at Carnegie Mellon University; May 2015; 169 Pages.
Ilic et al., "Dynamic Monitoring and Decision Systems (DYMONDS) Framework for Reliable and Efficient Congestion Management in Smart Distribution Grids;" In Bulk Power System Dynamics and Control—IX Optimization, Security and Control of the Emerging Power Grid (IREP); 2013 IREP Symposium; Aug. 25, 2013; 9 Pages.
Ilic et al., "Power Exchange for Frequency Control (PXFC);" Proceedings of the IEEE PES Winter Meeting; Jan. 1999; 11 Pages.
Ilic, "Toward a Unified Modeling and Control for Sustainable and Resilient Electric Energy Systems;" Foundations and Trends® in Electric Energy Systems; Dec. 22, 2016; 146 Pages.
Ilic et al., "Toward Multi-Layered MPC for Complex Electric Energy Systems" Chapter in The Handbook of Model Predictive Control; Sep. 2018; pp. 625-663; 39 Pages.
Jaddivada et al., "A Distribution Management System for Implementing Synthetic Regulation Reserve;" 2017 North American Power Symposium (NAPS); Sep. 2017; 6 Pages.
Joo et al., "Multi-Layered Optimization of Demand Resources Using Lagrange Dual Decomposition;" IEEE Transactions on Smart Grid, vol. 4, No. 4; Dec. 2013; 8 Pages.
Liu et al., "Droop Control with Improved Disturbance Adaption for PV System with Two Power Conversion Stages;" IEEE Transactions on Industrial Electronics, vol. 63, No. 10; May 4, 2016; 14 Pages.
Miao et al., "Distributed Model Predictive Control of Synchronous Machines for Stabilizing Microgrids;" 2017 North American Power Symposium (NAPS); Sep. 17, 2017; 6 Pages.
Miller et al., "Impact of Frequency Responsive Wind Plant Controls on Grid Performance;" GE Energy Article; 2011 IEEE Power and Energy Society General Meeting; Jul. 24, 2011; 8 Pages.
Miller et al., "Impact of Frequency Responsive Wind Plant Controls on Grid Performance;" GE Energy Presentation; Dec. 20, 2010; 10 Pages.
Popli et al., "Enabling Convex Energy Bids for Flexible Ramp Product via Smart Local Automation;" International Federation of Automatic Control (IFAC) Conference Paper; IFAC—PapersOnLine 48-30; pp. 245-250; Jan. 2015; 6 Pages.
Woyke, "A Smarter Smart City;" MIT Technology Review; Retrieved from https://www.technologyreview.eom/s/610249/a-smarter-smart-city/; Feb. 21, 2018; 12 Pages.
Xu et al., "Modeling of Electric Water Heaters for Demand Response: A Baseline PDE Model;" IEEE Transactions on Smart Grid, vol. 5, No. 5; Sep. 2014; 8 Pages.

* cited by examiner

METHODS AND SYSTEMS FOR SECURE SCHEDULING AND DISPATCHING SYNTHETIC REGULATION RESERVE FROM DISTRIBUTED ENERGY RESOURCES

RELATED APPLICATION

This application claims the benefit of U.S. Provisional Application No. 62/593,324, filed on Dec. 1, 2017. The entire teachings of the above applications are incorporated herein by reference.

GOVERNMENT SUPPORT

This invention was made with Government support under Grant No. FA8702-15-D-0001 awarded by the U.S. Air Force. The Government has certain rights in the invention.

BACKGROUND

As is known in the art, an electrical power grid (or a "power grid" or more simply a "grid") is used to deliver electrical power to a variety of different entities (e.g. substations and eventually end-users such as homes, commercial buildings and other structures and entities). Electrical power is typically produced by an electric power source (e.g. an electric generator) and transferred to the grid for transport and distribution. As is also known, grids are configured to ensure power supply-demand balance (i.e. a balance between an amount of electrical energy power supplied to the grid and an amount of electrical energy power drawn from the grid).

A typical feature of a power grid is that supply-demand imbalances manifest themselves as grid frequency excursions. Such grid frequency excursions are the same throughout the grid. Such frequency excursions may be measured, and such measurements may be utilized by large generators as a feedback signal to aid in determining generator operation required to offset such supply-demand imbalances.

In grids which do not have renewable energy sources (also referred to simply as "renewables") coupled thereto, this method works reasonably well. However, in grids having renewable energy sources coupled thereto (e.g. solar power sources and wind power sources) measurement of grid frequency excursions may not result in a feedback signal which accurately reflects how to address a supply-demand imbalance. This is particularly true when a grid has renewable energy sources coupled thereto which significantly contribute to electrical grid power (e.g. when the grid has many renewable energy sources coupled thereto and/or has renewable energy sources capable of providing a relatively large amount electrical power to the grid). Such a situation results in higher unpredictability of net demand and steeper "ramp requirements" (i.e. the amount of time required for a generation device to change from one power level to another) of generation devices.

Furthermore, many solar photovoltaic (PV) installations are coupled to a consumer-end of the grid and thus cannot be detected (or "seen") by existing utilities. As a result, the generators responsible for offsetting supply-demand imbalances incur increased wear-and-tear due to large, high-frequency, supply-demand imbalances, resultant from renewable energy sources coupled to the grid.

It has been recognized that instead of utilizing relatively large generators for balancing power supply-demand, small devices physically located close to consumers may be used to address supply-demand issues in a grid. Such small devices are referred to herein as distributed energy resource (DERs). Thus, DERs are being developed to balance the supply-demand.

These DERs may include both small generation devices, storage devices and consumption devices (so-called "demand-side" participation). A momentary adjustment (i.e. an adjustment over a small period of time) in consumption of many DERs can take the role of large generators tracking fast supply-demand imbalances. Such adjustments over short time-frames are referred to as synthetic regulation reserves (SRR). Such small DERs can act (or react) to changing conditions in power supply-demand imbalance nearly instantaneously due to negligible inertia (and thus, time) as opposed to the amount of inertia (and thus, time) required to utilize a large generator. This approach results in quicker response, lower wear-and-tear and lower cost of operation of large generators.

While the conceptual advantages of DER integration are clear, an IT-enabled platform for facilitating such DER integration at value is a technical and economic challenge. New modeling methods and software tools are required to facilitate increased penetration of DERs and renewables while ensuring reliable electrical service.

One state-of-the-art approach to address these issues includes integration of very large numbers of devices which probabilistically could meet utility-imposed performance specifications, such as power consumption adjustments at a given rate and within given ranges (e.g. see US Pat. Pub. No. 2018/0082385). One problem with this approach, however, is that it only considers a single aggregator as a price taker.

Another existing approach optimizes and manages integration via DERs using an "optimization engine" and a "resource modeler" so that small devices collectively participate in different types of demand response programs (e.g. see US Pat. Pub. No. 2014/0343984). One problem with this approach, however, is that the "optimization engine" fundamentally relies on unidirectional information exchange by sensing and measuring device response over time and predicting their future behavior. Furthermore, this approach assumes existing device control and does not necessarily ensure device or aggregator level performance. It also does not differentiate device-level performance or provide adequate economic incentives. Furthermore, the problem of many interacting "optimization engines" within a complex energy system is not considered.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Embodiments of the present disclosure relate to a synthetic reserve provisioning system (sometimes referred to as an "SRP system" or more simply an "SRPS") for enabling system-level balancing of supply and demand in complex energy systems. An SRPS includes a plurality of synthetic reserve provisioning (SRP) modules. Instead of balancing system demand using conventional generation resources alone, a hierarchically organized SRPS which comprises many providers, referred to as SRP modules, is introduced. The SRP modules represent aggregated, often small Distributed Energy Resources (DERs) such as controllable household devices or systems (e.g. home appliances, water heaters, electric vehicles); the SRP modules can also be large industrial users or large DERs. SRP modules are generally multiple levels of aggregators such as Network Optimized Distributed Energy Systems (NODES) operator, utility-owned Distribution System Operators (DSOs), non-utility owned aggregators Load Serving Entities (LSEs) and Independent System Operator (ISO). The energy and regulation reserve capacity are hierarchically dispatched and scheduled by different aggregators for balancing both predictable energy needs and hard-to-predict deviations. The energy and regulation reserve capacity are dispatched in a feed-forward way and the near-real-time power balancing by physical devices can be either done in a data-driven way or more rigorous feedback control design.

Other embodiments relate to modeling and control methods and systems for enabling SRP modules to provide energy and synthetic regulation reserve (SRR) as scheduled by a system-level SRP module. An energy conversion droop is introduced to quantify input-output characteristics of any SRP module. The energy conversion droop depends upon the SRP module's physical characteristics, local control of SRP modules, and a willingness of its consumers to participate. Consumer willingness depends upon the consumption patterns and tolerable comfort/ranges violations.

SRP modules are decision-making agents which compute and convey bids for energy and reserve capacity for certain price ranges to higher-layer SRP modules. These bids generally have an economic sub-objective which also observes physical energy conversion droop and as such are provably implementable in system operation. The bids are generally communicated from the lower level SRP modules to higher level SRP modules. The higher layer modules in turn aggregate these bids to compute and communicate aggregate bids to the highest level SRP module.

For context and without limitation, embodiments of the disclosure comprise three decision making layers: lowest level DER agents, NODES—their aggregators, and several NODES are coordinated by the system-level highest SRP (ISO). A skilled artisan understands that embodiments of the disclosure can comprise multiple layers, which could include DSOs and LSEs. The SRPS computer platform supports multi-directional information about higher layer prices being communicated to lower layer SRP modules to facilitate their decision making. The bids are cleared by the higher layer SRP modules, resulting in SRP-level prices for energy/SRR capacity. In some embodiments, the decision making for all SRP layers and the information flow are described in detail herein. Advantageously, embodiments of the disclosure support provable performance of all SRP modules and their integration in system level operations for providing electricity service. Hierarchical modular integration is fully scalable, because the technology-specific complexity is distributed within SRP modules and only minimal information exchange is required for coordinating SRP modules.

One aspect of the present disclosure relates to a synthetic regulation reserve provisioning (SRP) system (SRPS) comprising an energy supply monitoring system configured to receive energy supply data from an electrical grid. A load prediction processor is coupled to the energy supply monitor. The load prediction processor is responsive to signals provided thereto and configured to provide a prediction of future energy load needs. An energy bidding and pricing prediction processor is coupled to the load prediction processor and the energy supply monitoring system. The energy bidding and pricing prediction processor is configured to bid for energy based at least on the predicted future energy load needs. An energy provisioning processor is coupled to the energy supply monitoring system, load prediction processor, and energy bidding and pricing prediction processor. The energy provisioning processor is configured to provide a provisioning signal that controls a schedule, supply, and dispatch of SRR corresponding to one or more distributed energy resources (DERs), wherein the dispatch is always based upon bids provided by said energy bidding and pricing prediction processor.

In an embodiment, the SRP system can further comprise a network interface configured to enable the SRP system to communicate with one or more decision-making agents to provision SRR in a hierarchy of decision-making agents.

In another embodiment, the SRP system can further comprise a lower hierarchy SRP module interface communicatively coupled to one or more SRR device systems via the network interface. The lower hierarchy SRP module interface can be configured to aggregate energy consumption-related data of one or more lower hierarchy decision-making agents. An upper hierarchy module interface can further be communicatively coupled to one or more upper hierarchy decision-making agents via the network interface. The upper hierarchy module interface can be configured to receive information about aggregate energy consumption and associated prices from the upper hierarchy decision-making agents.

In embodiments, the load prediction processor can be further configured to provide a prediction of future energy load needs based on the aggregate energy consumption-related data of the one or more lower hierarchy decision-making agents.

In additional embodiments, the energy bidding and pricing prediction processor can be further configured to bid for energy based at least on the aggregate energy consumption-related data of the one or more lower hierarchy decision-making agents. The energy bidding and pricing prediction processor can also be further configured to implement a predictive based model capable of controlling one or more DERs to perform an energy storing operation such that the DERs remain switched ON at a point in time when the electrical grid is not in need and switched OFF at a point in time when the electrical grid is in need so as to cut down on energy consumption, wherein said energy storing operation corresponds to a pre-heating operation.

In embodiments, the SRP system can further comprise a grid interface coupled to the energy supply monitoring system. The grid interface can be configured to interface with a physical layer of the electrical grid and receive energy supply data from one or more power generators.

In another aspect, a synthetic regulation reserve (SRR) control system comprises an SRR controller configured to provide one or more control signals to one or more distributed energy resources (DERs). The SRR control system further comprises one or more sensors, each of which are coupled to the one or more DERs. Each of said sensors are configured to determine one or more energy characteristics of the one or more DERs. A usage prediction processor is coupled to the one or more sensors, the usage prediction processor configured to determine future energy requirements of the one or more DERs.

In embodiments, the SRR control system further comprises an SRR device interface configured to communicatively couple with the one or more DERs such that the SRR controller can provide the one or more control signals to the one or more DERs. The SRR control system can further comprise a network interface communicatively coupled to a synthetic regulation reserve provisioning (SRP) system (SRPS). The network interface can be configured to receive control signals from the SRPS. The SRR control system can further comprise an energy bidding processor that can be configured to compute DER level energy bids based on the one or more energy characteristics and the determined future energy requirements. An SRP system interface can be coupled to the network interface and the energy bidding processor. The SRP system interface can be configured to couple the control signals and the DER level energy bids to the SRR controller. The SRR control system can further comprise a memory configured to store the energy characteristics of the one or more DERs.

In another aspect, a system comprises an electrical grid. One or more power generators can be coupled to the electrical power grid. Additionally, one or more distributed energy resources (DERs) can be coupled to the electrical power grid. Further, one or more synthetic regulation reserve (SRR) device control systems can be coupled to the one or more DERs. A hierarchy of energy decision-making agents can be configured to distribute energy from the electrical power grid to an end user. The system further comprises a synthetic regulation reserve provisioning (SRP) system (SRPS) configured to provide a provisioning signal that controls a schedule, supply, and dispatch of SRR corresponding to one or more distributed energy resources (DERs).

In embodiments, the one or more DERs can comprise one or more of: chemical loads, electrical loads, and thermostatically controlled loads (TCLs). The electrical loads can comprise at least one or more of: electric vehicles (EVs) and batteries. Additionally, the TCLs can comprise at least one or more of: water heaters, air conditioners, and heating, ventilation, and air conditioning (HVAC) systems. The chemical and electrical loads can define their SRR based on the load's state of charge (SOC). The TCLs can define their SRR based on the load's thermal energy stored in a fluid, wherein the fluid comprises at least one or more of: air and water.

In further embodiments, the SRP system can comprise an energy supply monitoring system configured to receive energy supply data from the electrical grid. A load prediction processor can be coupled to the energy supply monitor. The load prediction processor can be responsive to signals provided thereto and configured to provide a prediction of future energy load needs. An energy bidding and pricing prediction processor can be coupled to the load prediction processor and the energy supply monitoring system. The energy bidding and pricing prediction processor can be configured to bid for energy based at least on the predicted future energy load needs. An energy provisioning processor coupled to the energy supply monitoring system, load prediction processor, and energy bidding and pricing prediction processor. The energy provisioning processor can be configured to provide a provisioning signal that controls a schedule, supply, and dispatch of SRR corresponding to one or more distributed energy resources (DERs), wherein the dispatch is always based upon bids provided by said energy bidding and pricing prediction processor.

In additional embodiments, a network interface can be configured to enable the SRP system to communicate with one or more decision-making agents to provision SRR in a hierarchy of decision-making agents.

The SRP system can further comprise a lower hierarchy SRP module interface and an upper hierarchy module interface. The lower hierarchy SRP module interface can be communicatively coupled to one or more SRR device systems via the network interface. Additionally, the lower hierarchy SRP module interface can be configured to aggregate energy consumption-related data of one or more lower hierarchy decision-making agents. The upper hierarchy module interface can be communicatively coupled to one or more upper hierarchy decision-making agents via the network interface. The upper hierarchy module interface can also be configured to receive information about aggregate energy consumption and associated prices from the upper hierarchy decision-making agents. A grid interface coupled to the energy supply monitoring system. The grid interface can be configured to interface with a physical layer of the electrical grid and receive energy supply data from one or more power generators.

The system can further comprise a synthetic regulation reserve (SRR) control system comprising an SRR controller configured to provide one or more control signals to one or more distributed energy resources (DERs). The SRR control system further comprises one or more sensors, each of which are coupled to the one or more DERs. Each of said sensors are configured to determine one or more energy characteristics of the one or more DERs. A usage prediction processor is coupled to the one or more sensors, the usage prediction processor configured to determine future energy requirements of the one or more DERs.

In embodiments, the SRR control system further comprises an SRR device interface configured to communicatively couple with the one or more DERs such that the SRR controller can provide the one or more control signals to the one or more DERs. The SRR control system can further comprise a network interface communicatively coupled to a synthetic regulation reserve provisioning (SRP) system (SRPS). The network interface can be configured to receive control signals from the SRPS. The SRR control system can further comprise an energy bidding processor that can be configured to compute DER level energy bids based on the one or more energy characteristics and the determined future energy requirements. An SRP system interface can be coupled to the network interface and the energy bidding processor. The SRP system interface can be configured to couple the control signals and the DER level energy bids to the SRR controller. The SRR control system can further comprise a memory configured to store the energy characteristics of the one or more DERs.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
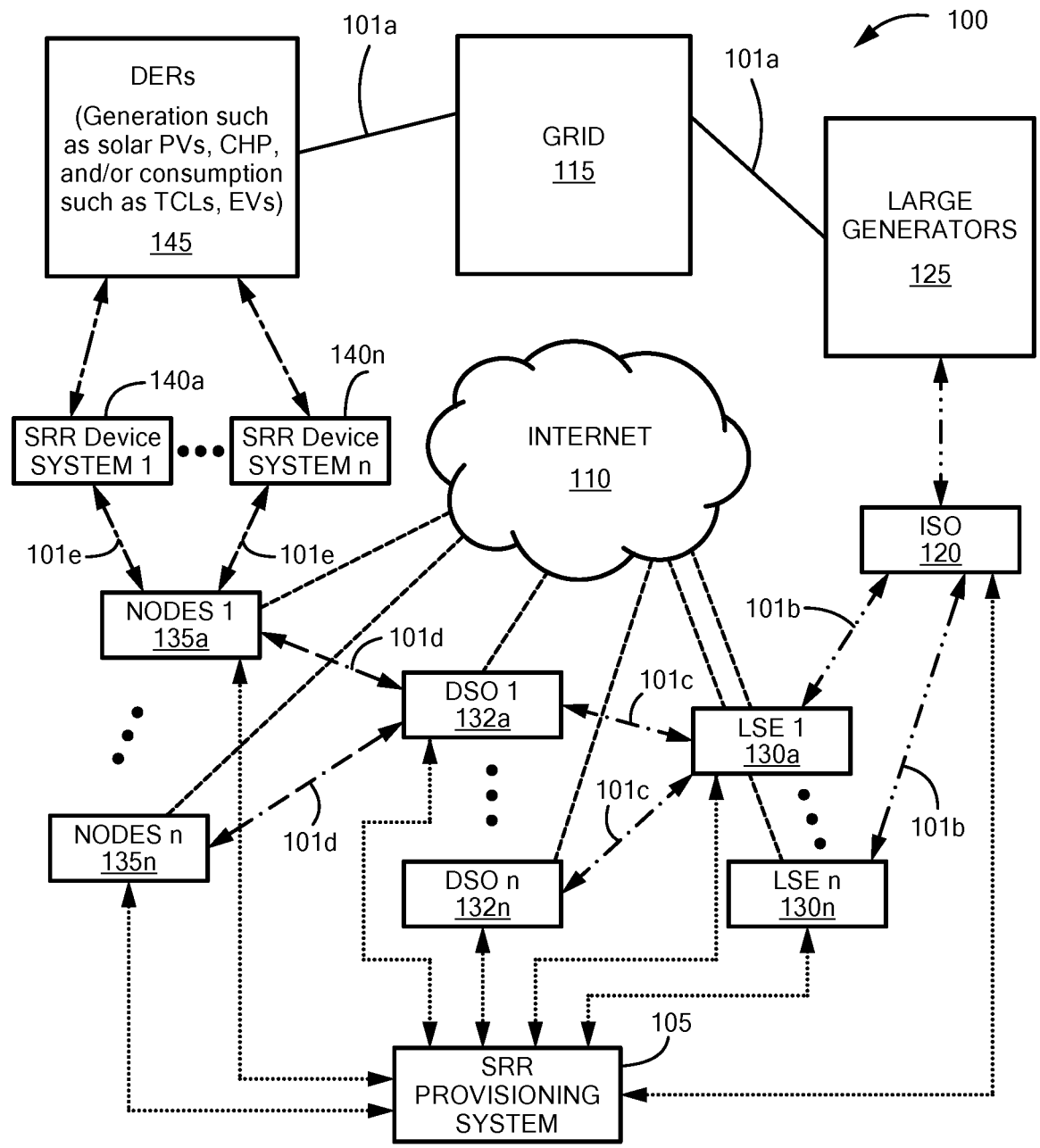
FIG. 1 is a block diagram of an electrical grid network and a communications network for scheduling and supplying synthetic regulation reserves (SRRs) according to example embodiments described herein.

Referring now to FIG. 1, a portion of a complex electric energy system 100 includes an electric power grid 115 (also referred to as an "electric grid" or more simply a "grid") formed from a network of synchronized power providers and consumers. Power providers may, for example, correspond to one or more electrical power generation sources 125 and distributed energy resources or DERs 145 coupled via electrical transmission lines 101a (also referred to as power lines). DERs 145 also include consumption devices (i.e. power consumers). Generators 125, DERs 145 and electrical wires (e.g. power lines) 101a all form a portion of a so-called physical layer of system 100. The electric energy system 100 further comprises a communications layer (i.e., network) which may include, for example, internet 110.

In general, power generation sources 125 may be provided as nonrenewable energy sources (e.g., coal, natural gas, petroleum, nuclear, etc.) power plants (e.g. hydroelectric power plants) and/or renewable energy sources (e.g., solar, wind, geothermal, hydroelectric, etc.) capable of sourcing (or providing) relatively large amounts of electrical power to the grid 115 for eventual use by consumers.

The DERs 145 are each electrically coupled to the grid 115 and typically correspond to generation devices and/or consumption devices distributed throughout the grid 115 (e.g. household appliances and any type of machine). DER's are typically located in relatively close physical proximity to end-user consumers (e.g. in physical proximity to homes, buildings, electric vehicles and other structures).

Some DER's are controllable meaning that operation of the DER may be controlled from via a signal generated external to the DER and provided to the DER. Examples of controllable DERs include, but are not limited to, thermostatically controlled electric water heaters, heating, ventilating, air-conditioning and cooling systems, refrigerators, chillers. DER's may also correspond to electrically controlled devices such as the electric vehicles, batteries, solar photovoltaics or even electromechanically controlled devices such as the industrial motor drives, pumps, small diesel generators. Some DER's are unable to be controlled and thus are referred to as "uncontrollable devices."

At least some controlled or controllable DER's may also have coupled thereto (or embedded therein) one or more synthetic regulation reserve (SRR) device controllers 140a-140n. SRR device controllers will be described in detail below at least in conjunction with FIG. 3. Suffice it here to say that SRR device controllers 140a-140n are coupled to via communication network 110.

Electric energy system 100 further comprises so-called "decision-making agents" 120, 130a-n, 132a-n, 135a-n which may be coupled to each other directly, or indirectly e.g. through other agents via communication links 101b-e of the communication network 110.

In some embodiments, indirect communication links (e.g. ones of 101b-e) can be a result of an existing infrastructure and hierarchy in complex energy systems. Such a hierarchy may be organized from a lowermost coordinating layer to an uppermost coordinating layer. In the illustrative system of FIG. 1, a hierarchy having three layers is shown with a first (or lowermost) layer corresponding to NODES (135a-n); a second (or intermediate) layer corresponding to DSOs (132a-n); and a third (or uppermost) layer corresponding to LSEs (130a-n) and ISO(s) (120). Thus, in this illustrative embodiment, an upper coordinating entity is an aggregator of energy supply and demand of one or more lower coordinating entities in the hierarchy. For example, LSEs 130a-n aggregate energy supply and demand of one or more of the DSOs 132a-n. In another example, the NODES 135, using the SRP system 105, can aggregate the energy and supply demand of the one or DERs 145 associated with one or more SRR device controllers 140a-140n.

Although in this illustrative embodiment, three layers are shown, it should, of course, be appreciated that after reading the disclosure provided herein, those of ordinary skill it the art will appreciate that fewer or more than three layers may be used. The number of layers to use to suit the needs of a particular application, may be selected in accordance with a variety of factors including, but not limited to, regulatory rules; willingness of decision makers to handle risk or to pay to someone else for handing it; IT in place to support their implementation; decision makers' preferences amongst others.

The complex electric energy system 100 further includes a synthetic reserve provisioning (SRP) system 105. Detailed operations of the SRP system 105 will be described herein below at least in conjunction with FIG. 2. Suffice it here to say that SRP system 105 functions to balance supply and demand within complex electric energy system 100 that includes a plurality of coordinating entities 120, 130a-n, 132a-n, 135a-n, generators 145, and controllable distributed energy resources (DERs) 145.

In some embodiments, the coordinating entities may correspond to an Independent System Operator (ISO) 120, Load Serving Entities (LSEs) 130a-n, Distribution System Operators (DSOs) 132a-n, and Network Optimized Distributed Energy Systems (NODES) 135a-n. As noted above, in embodiments, there exists a hierarchy among these decision-making agents 120, 130a-n, 132a-n, 135a-n for balancing their own supply-demand mismatch by interacting with other decision-making agents through communication network 110.

An ISO 120 may correspond to a system-level operator and can interact with lower-level entities such as LSEs 130a-n, DSOs 132a-n, NODES 135a-n, and/or DERs 145. For example, ISO(s) 120 may be the highest-level decision-making agents and are configured to control access by the plurality of power sources 125 to certain regional transmission systems of the grid 115 that coordinate power distribution to certain geographic regions.

An LSE 130 may be non-utility owned and interact with lower-level entities such as DSOs 132a-n, NODES 135a-n, and/or SRR Device controllers 140a-n. For example, the LSE(s) 130a-n may be decision makers responsible for mediating power exchanges to several DSOs 132a-n. Specifically, the LSEs 130 can be configured to control power distribution to DSOs 132a-n.

DSOs 132a-N may be utility-owned and can interact with lower level entities such as NODES 135a-135n. For example, DSOs 132a-n can be operating managers (and sometimes owners) of energy distribution networks that comprise, for example, over-head and underground cables leading to homes and/or business.

NODES 135 may be a coordinating layer that coordinate energy supply and demand of the DERs 145. NODES 135a-n can be individual or groups of commercial buildings and/or residential households with their own decision-making ability and make decisions on behalf of their DERs. They are effectively smaller-scale decision-makers than DSOs 132 and LSEs 130.

The SRP system 105 is coupled to the plurality of so-called coordinating entities (also referred to as decision-making agents or aggregators) 120, 130a-n, 132a-n, 135a-n responsible for balancing supply and demand within a complex electric energy system such as the system 100 shown in FIG. 1.

The SRP system 105 functions to balance supply and demand (and ideally, to always balance supply and demand). Such balance of supply and demand may be achieved and/or maintained, for example, by SRP system 105 scheduling controllable devices (e.g., the DERs 145) to supply (and ideally, optimally supply) energy and synthetic regulation reserve (SRR). SRR is a flexible generation/consumption adjustment that an aggregate of distributed energy resources (DERs) can provide to balance short-term supply-demand mismatches. In an embodiment, the SRR of a DER 145 relates to its ability to synthetically store energy. Synthetic storing of energy refers to the ability to shift, in time, consumption or supply of energy by adapting physical use of energy. For example, HVACs store synthetically thermal energy in air, and water heaters (WHs) store thermal energy in water consumed, and alike. For example, the SRR of an electric vehicle, or a battery can be based on its state of charge (SOC); the SRR capacity of a thermostatically controlled load (TCL) may be based on thermal energy stored in a fluid such as air and/or water. SRR can also be related to flexibly adjusting long-term scheduled energy generation or consumption values.

As described herein, the SRP system 105 schedules operation of controllable devices to balance predictable inflexible demand and unpredictable deviations in demand, respectively, by adjusting or otherwise controlling the SRR of the controllable devices. Such controllable devices include but are not limited to controllable generators 125 and controllable DERs 145. In embodiments, the SRP system 105 may be embedded in any of the decision-making agents 120, 130a-130n, 132a-132n, 135a-135n. When embedded into any of the decision-making agents 120, 130a-n, 132a-n, 135a-n, SRP system 105 can schedule and supply SRR on behalf of its lower-level agents. For example, the SRP system 105 can be configured to transmit and receive energy related data such as electrical energy demand; consumer comfort levels such as the temperature set-points in thermostatically controlled loads (TCLs); non-electrical usage such as the fluid flow rates in TCLs; or driving schedules in electric vehicles (EVs) and associated economic signals such as cleared energy bid prices.

Figure 2:
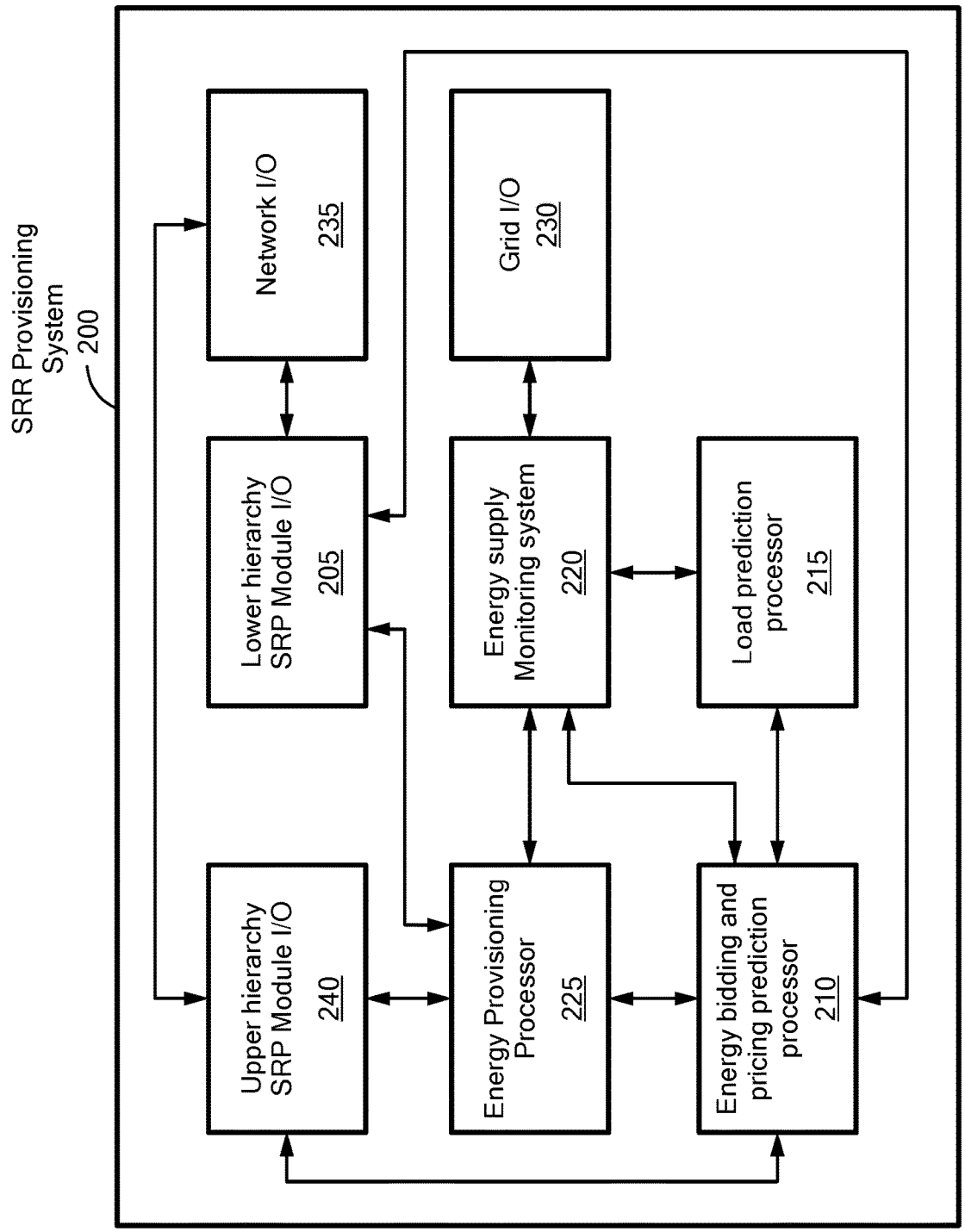
FIG. 2 is a block diagram of a synthetic reserve provisioning (SRP) system according to example embodiments described herein.

Referring now to FIG. 2, a synthetic regulation reserve provisioning (SRP) system 200, which may be the same as or similar to SRP system 105 described above in conjunction with FIG. 1, includes a lower hierarchy SRP interface 205, an energy bidding and pricing prediction processor 210, a load prediction processor 215, an energy supply monitor 220, an energy provisioning processor 225, a grid interface 230, a network interface 235 and an upper hierarchy SRP interface 240.

The SRP system 200 can be embedded within or communicatively coupled to one or more decision-making agents (e.g., the decision-making agents 120, 130a-n, 132a-n, 135a-n of FIG. 1).

The network interface 235 is configured to send communication signals over a communication network (e.g. the network 110 described above in conjunction with FIG. 1). The network interface 235 thus enables SRP system 200 to communicate with the one or more decision-making agents to schedule, supply, and dispatch (i.e., "provision") SRR.

In this illustrative embodiment, the lower hierarchy SRP module interface 205 may be communicatively coupled to one or more SRR device systems (e.g. systems 140a-140n of FIG. 1) via the network interface 235. In embodiments, the lower hierarchy SRP module interface 205 is configured to aggregate energy consumption-related data of one or more lower hierarchy agents. That is, those agents having a lower hierarchy than that of the agent to which the SRP system 200 is embedded or communicatively coupled as described in FIG. 1. For example, if the agent is a NODE (e.g., one or more of the NODES 135a-n of FIG. 1), the lower hierarchy SRP module interface 205 may be configured to receive energy consumption-related data of one or more distributed energy resources (DERs) (e.g., the DERs 145 of FIG. 1). The energy consumption-related data can be as abstract as electrical power injection/consumption limits or can be as detailed as device specific internal state variables dictating user comfort such as, e.g., temperature and water flow rate in water heaters or can be the intermediate of the two types of information.

The network interface 235 is also coupled to an upper hierarchy interface 240. The upper hierarchy interface 240 is communicatively coupled to upper hierarchy non-physical decision-making agents via the network interface 235. The upper hierarchy interface 240 may be configured to receive information about aggregate energy consumption and associated prices from the upper hierarchy decision-making agents. That is, those agents having a higher hierarchy than that of the agent to which the SRP system 200 is embedded or communicatively coupled as described in FIG. 1.

Upper and lower hierarchy interfaces 205, 240 are coupled to an energy provisioning processor 255 whose function will be described in detail below. Briefly, however, the energy provisioning processor 225 receives information provided thereto from the upper and lower hierarchy interfaces 205, 240 and uses this and other information, at least in part, to schedule, supply, and distribute (i.e., " "provision") the SRR of DER's coupled to the grid.

The load prediction processor 215 receives energy consumption data obtained by the lower hierarchy SRP module interface 205. The load prediction processor 215 maintains historical energy consumption data to predict future energy consumption of DERs (or aggregate of DERs) for one or more NODES (e.g., the NODES 135 of FIG. 1) to which the respective DERs (or their aggregate) are connected to via the network 110. For example, the load prediction processor 215 may in some cases predict the most-detailed comfort requirements of devices or can just predict the electrical consumption-related data. In other embodiments, the load prediction processor 215 maintains historical energy consumption data to predict future energy consumption of other upper hierarchy decision-making agents (such as DSOs 132, LSEs 130 of FIG. 1).

The energy supply monitor 220 receives energy supply data from the grid interface 230. The energy supply data can be data associated with electrical consumption, terminal voltage and currents.

The energy bidding and pricing predictor processor 210 predicts energy prices and utilizes them to compute bids for energy based on the energy consumption data, load prediction data, and the energy supply data. Additionally, the energy bidding and pricing predictor processor 210 can implement a predictive based model capable of controlling one or more DER's to perform an energy storing operation such that they DER's remain switched ON at a point in time when the electrical grid is not in need and switched OFF at a point in time when the electrical grid is in need so as to cut down on energy consumption. The energy storing operation can correspond to a pre-heating operation.

For example, if the SRP system 200 is embedded in a NODE, the energy bidding and pricing predictor processor 210 may utilize all the data fed into it, and then compute how much energy the aggregate of DERs connected via network 115 would need and at what price would they like to consume energy.

Based on cleared bids, the energy consumption data, and the load prediction data, the energy provisioning processor 225 controls a schedule, supply, and dispatch of SRR of the DERs which are coupled via the network 110. In embodiments, the dispatch can be based upon bids provided by the energy bidding and pricing predictor processor. Depending on the method of decision making embedded in devices and/or decision-making agents, provisioned energy may or may not be equal to energy supply values measured via the grid interface.

Figure 3:
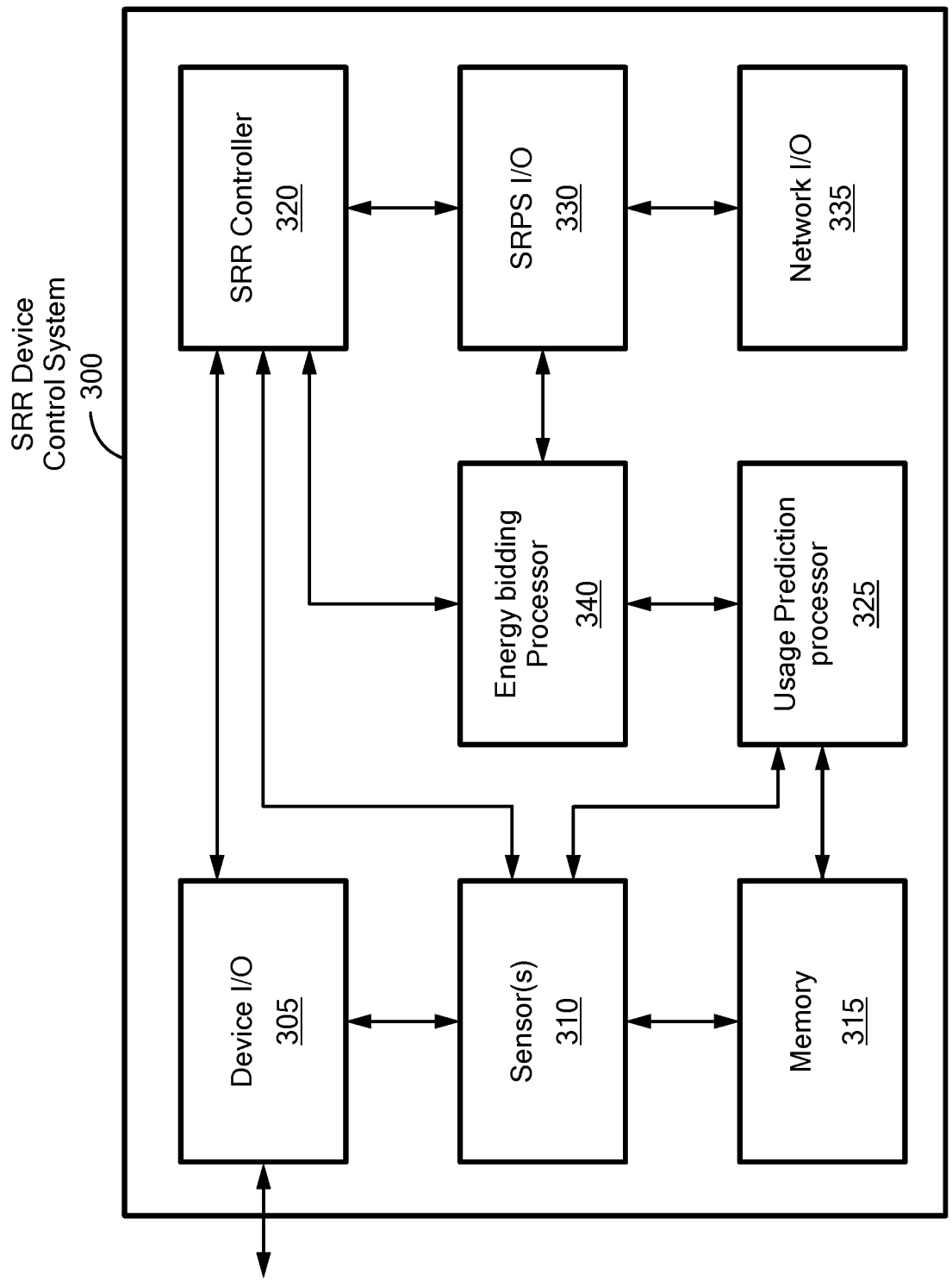
FIG. 3 is a block diagram of a synthetic regulation reserve (SRR) device controller according to example embodiments described herein.

Referring now to FIG. 3, a synthetic regulation reserve (SRR) device system 300 which may be the same as or similar to SRR device systems 140a-n described above in conjunction with FIG. 1. The SRR device systems can be embedded within or communicatively coupled to one or more DERs (e.g., the DERs 145 of FIG. 1).

In an embodiment, the SRR device system can comprise a device interface 305, sensor(s) 310, memory 315, SRR controller 320, usage prediction processor 325, SRP system interface 330, network interface 335, and energy bidding processor 340.

In embodiments, the network interface 335 may be configured to communicate with an external network such as network 110 described above in conjunction with FIG. 1. Network interface 335 may receive, for example, energy control signals from an SRP system such as one of the SRP systems 105, 200 described above in conjunction with FIGS. 1 and 2, respectively. The network interface 335 couples the signals provided thereto to an SRP system interface 330 which in turn couples the signals to an SRR controller. SRPS interface 330 is also coupled to an energy bidding processor 340 and provides information to and receives information from energy bidding processor 340. In a manner to be described in detail below, the SRR controller 320 controls energy usage of a DER by utilizing energy control signals provided thereto from an SRP system via SRP system interface 330.

The sensors 310 measure device-specific metrics of the DER such as the temperature or fluid flow rate in TCLs, the SOC in batteries and the electrical voltage and currents at a grid interface of the DER. The sensors 310 can be thermoelectric sensors for temperature measurements, flow meters for fluid flow, ammeters, voltmeters for electrical measurements, tachometers for rotational speed measurements in pumps, diesel generators and motor drives.

The collected metrics are stored in memory 315. This stored data along with real-time measurements are utilized by usage prediction processor 325 to compute future usage patterns.

The SRR controller 320 controls energy usage of the DER by utilizing energy control signals received from an SRP system (e.g., the system 200 of FIG. 2) through the SRP system interface 330 and present values of comfort metrics as measured and/or computed by sensors. For example, the SRR controller 320 can control an ON/OFF state, thermal set point, state of charge (SOC) level, amongst other control actuations of the DER. In embodiments, SRR controller 320 determines control-specific limitations. For example, if the DER is a hot water heater, then SRR controller 320 determines an available band of temperatures over which the hot water heater may adjust the temperature of water within the heater or fluid flow rates in TCLs without overheating or under-heating the fluid, and/or the allowable increments in voltage or currents without damaging the insulation of the electrical wires in the water heater.

Such information may be utilized by the energy bidding processor 340, along with the future usage predictions to compute device-level SRR bids. For example, the bidding and usage prediction processor 325 may be able to predict water usage values in water heaters to then be able to compute the bids for energy requirements in the future knowing the controller limitations of the SRR device. Accordingly, an SRP system (e.g., the SRP system 200 of FIG. 2) using its energy bidding and pricing prediction processor can aggregate device-level SRR bids when computing energy bidding prices.

Figure 4:
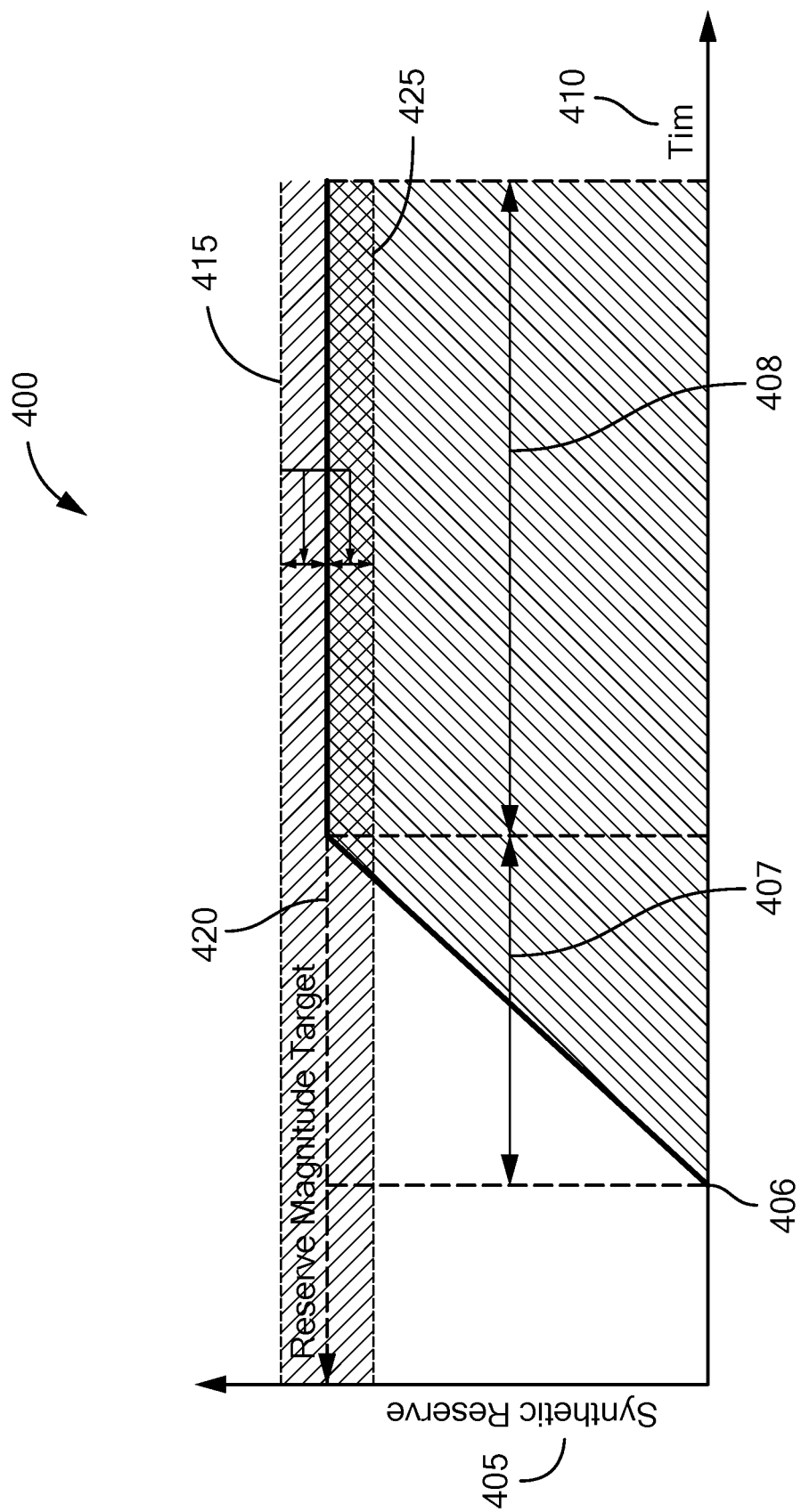
FIG. 4 is a graph illustrating performance criteria of a synthetic reserve provisioning system (SRPS) according to example embodiments described herein.

Referring now to FIG. 4, shown is a plot (or graph) 400 of synthetic regulation reserve (SRR) 405 over time 410 as coordinated by an SRPS of an aggregate of DERs (e.g., the DERs 145 of FIG. 1). The illustrative plot of FIG. 4 is thus a quantification of performance targets of an SRPS such as the SRPS described above at least in conjunction with FIG. 2.

An aggregate of DERs may have a minimum reaction time (sometimes referred to as a delay time) to SRR provision signals (denoted by reference numeral 406 in FIG. 4). Also, the aggregate of DERs can produce a maximum SRR capacity 420, referred to as reserve magnitude target (RMT). A variability associated with RMT 420 is illustrated in FIG. 4 as a band of tolerance 420, also called reserve magnitude variability tolerance (RMVT). After applying all controls by switching power consumed on and off, an expected performance of the SRPS governing power exchanges at specific grid connection points is to stay within the bands dictated by 415 (RMT+RMVT) and 425 (RMT−RMVT).

It is expected that the DER should be at a reserve magnitude target 420 during a reserve block time 408, (also referred to as a "reserve provisioning duration"). Ideally, the system achieves the RMT within a desired ramp time (407-406). The ramp time depends upon how rapidly the SRR devices can ramp up their power generation or implement consumption adjustments upon receiving SRR signals.

As stated herein, a DER can be one or more synthetic regulation reserve (SRR) devices. SRR devices can include one or more of: chemical loads, electrical loads, and TCLs. Each DER can be electrically and/or communicatively coupled to an SRR device controller (e.g., the controller 300 of FIG. 3) and each DER can have a minimum SRR capacity 406 and a maximum SRR capacity 415.

In one example, an SRR device controller (e.g., the controller 300 of FIG. 3) determines that the SRR of the DER should be at a reserve magnitude target 420 during a reserve block time 408. In this example, the SRR of the DER is at the minimum SRR capacity level 406. Depending upon an amount of energy supplied to the DER, it takes a ramp period 407 to reach the reserve magnitude target 420. Accordingly, the SRR device controller begins the ramp period at a time 410 to ensure the SRR capacity reaches the reserve magnitude target 420.

For example, the DER can be a hot water heater. Assuming the hot water heater has a full tank of hot water, the SRR for the hot water heater can correspond to the temperature of the water. Accordingly, the SRR device can provide a control signal to establish a setpoint temperature of the water to a reserve magnitude target 420. In this way, when water from the hot water tank is used after the reserve period 408, the temperature of the water is within a temperature range which is acceptable to a user. Accordingly, energy can be used at times when it is relatively inexpensive to heat water (e.g. during times when demand for electricity is relatively low— e.g. during so-called "off-peak" hours). With this approach, energy is not used or needed when it is relatively expensive to heat water (e.g. during times when demand for electricity is relatively high—e.g. during so-called "peak" hours such as in the morning when many people take showers).

Figure 5:
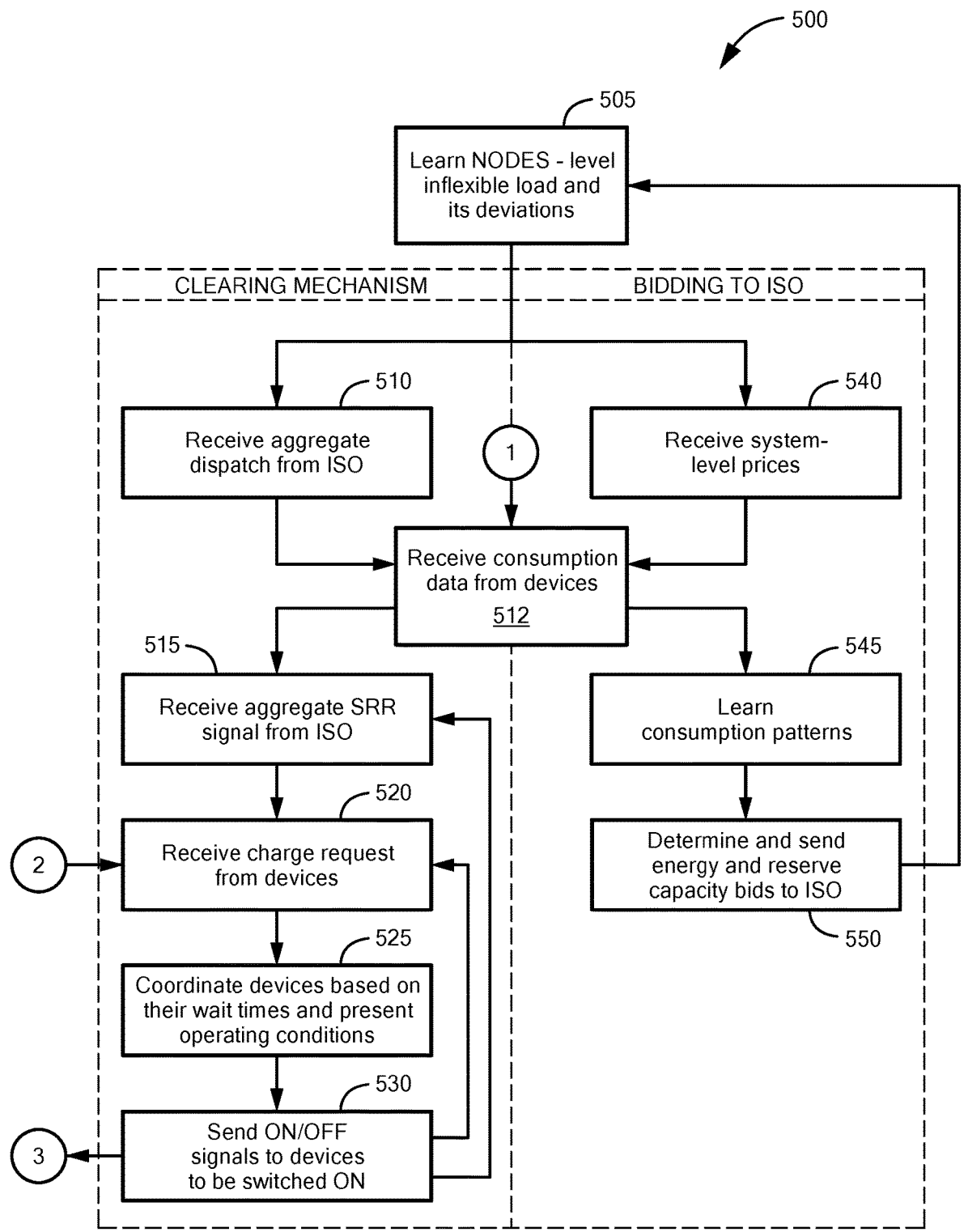
FIGS. 5-5A are flow diagrams of a method for provisioning synthetic regulation reserve (SRR) by a Network Optimized Distributed Energy Systems (NODES) operator, without capturing the physical characteristics of the devices, according to example embodiments described herein.
Figure 5A:
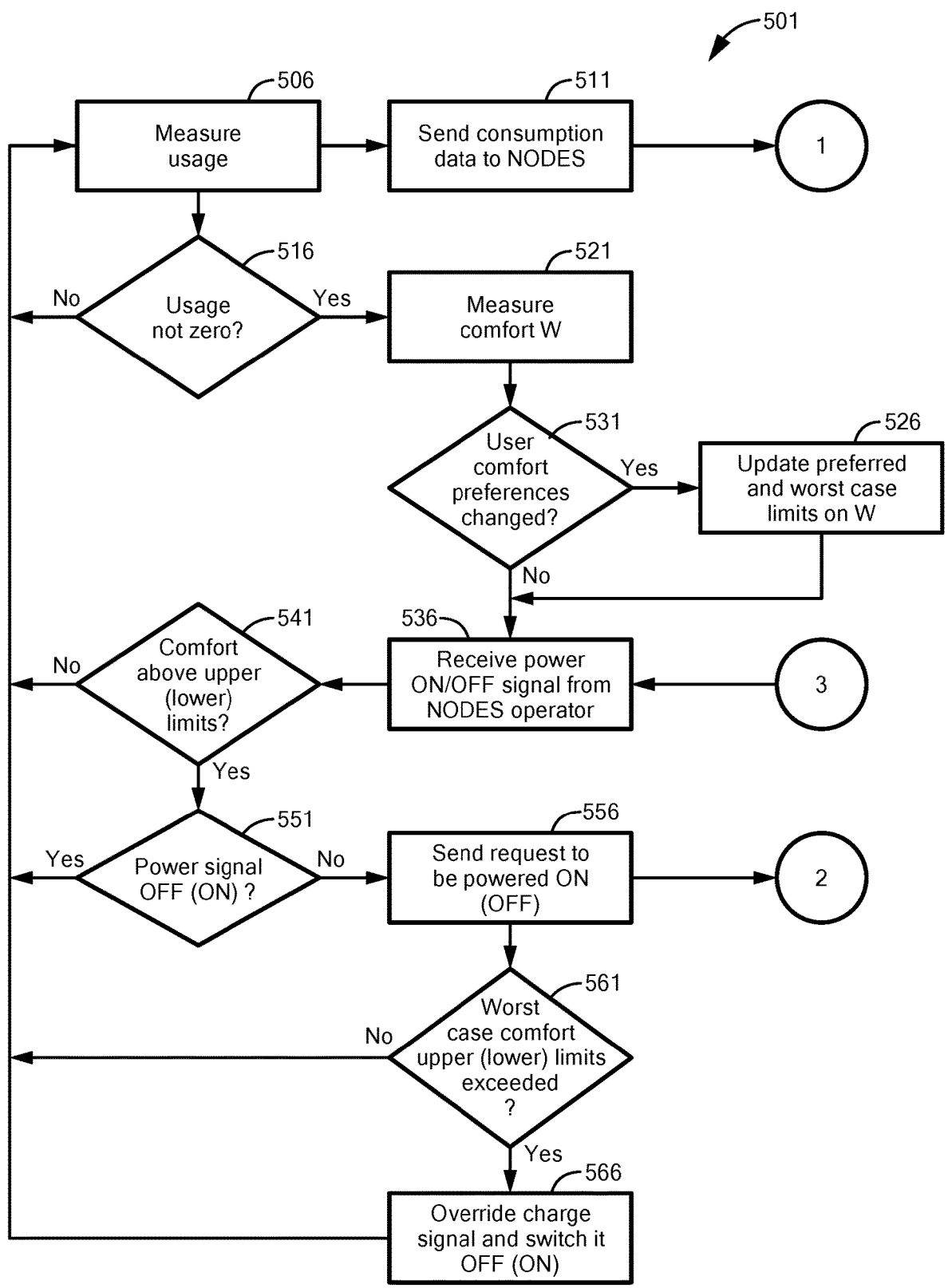
Figure 6:
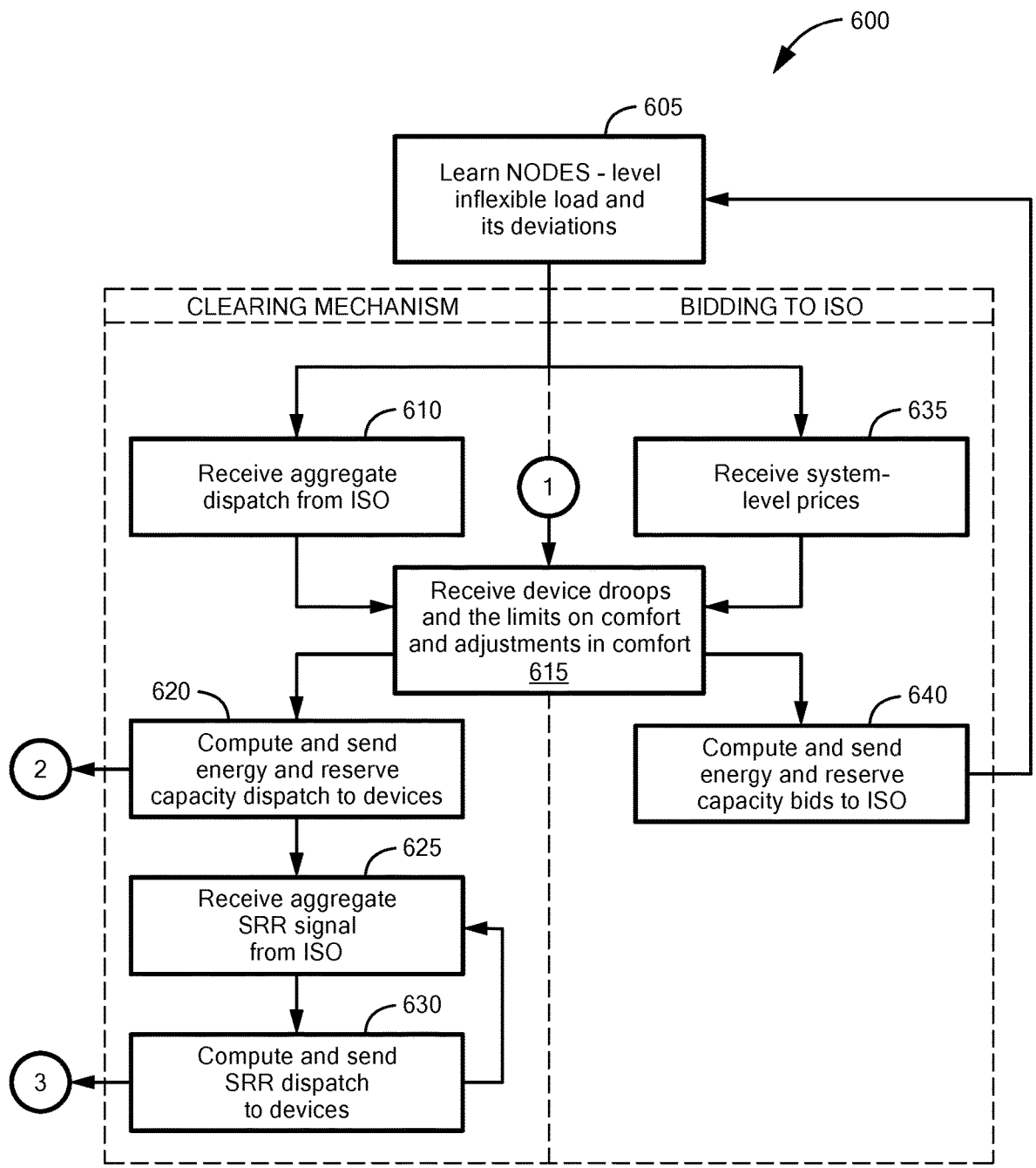
FIGS. 6-6A are flow diagrams of another method for provisioning synthetic regulation reserve (SRR) using distributed energy resources (DERs), by taking into explicit consideration the physical characteristics of the SRR devices and its limitations, according to example embodiments described herein.
Figure 6A:
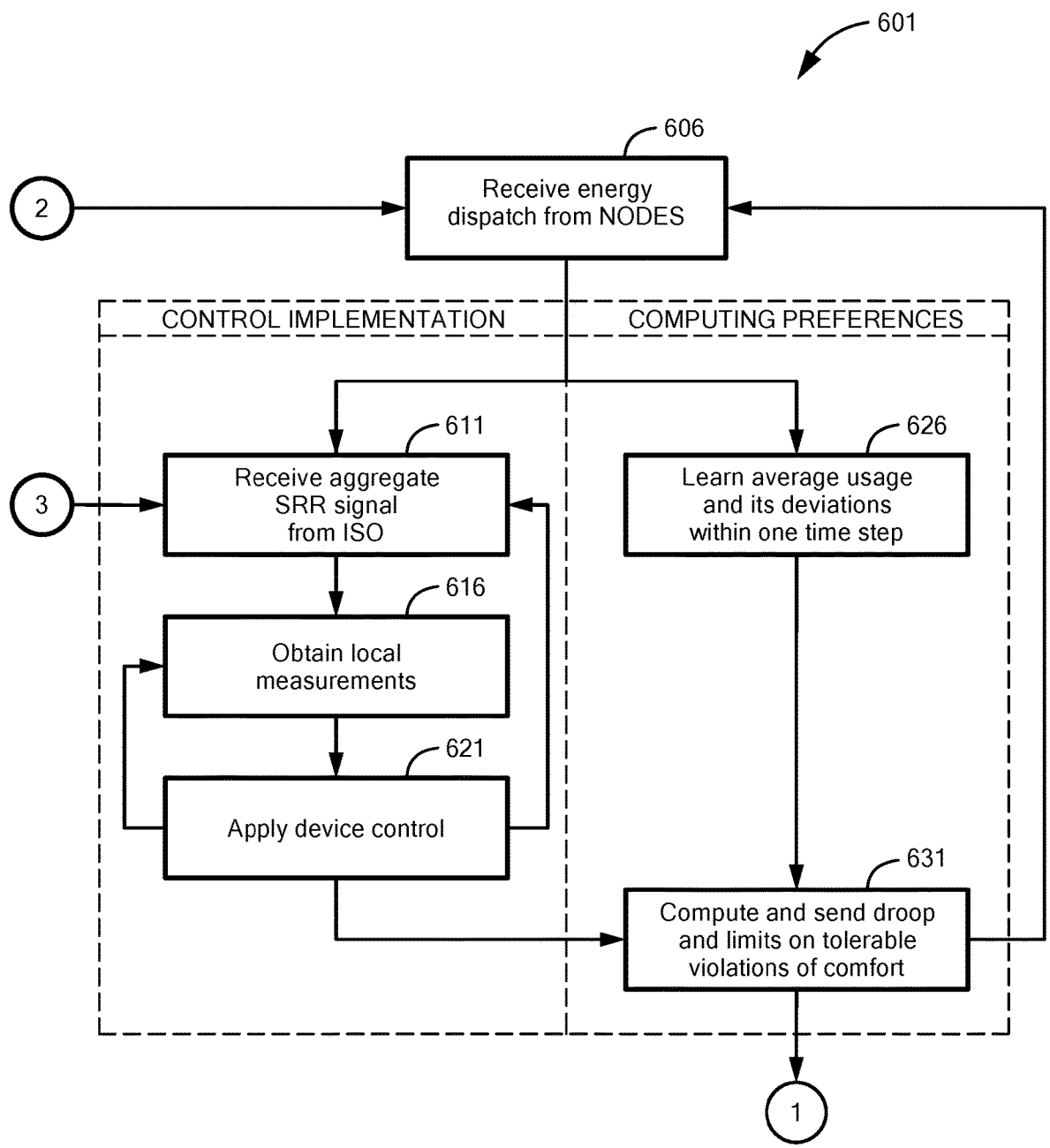
Figure 7:
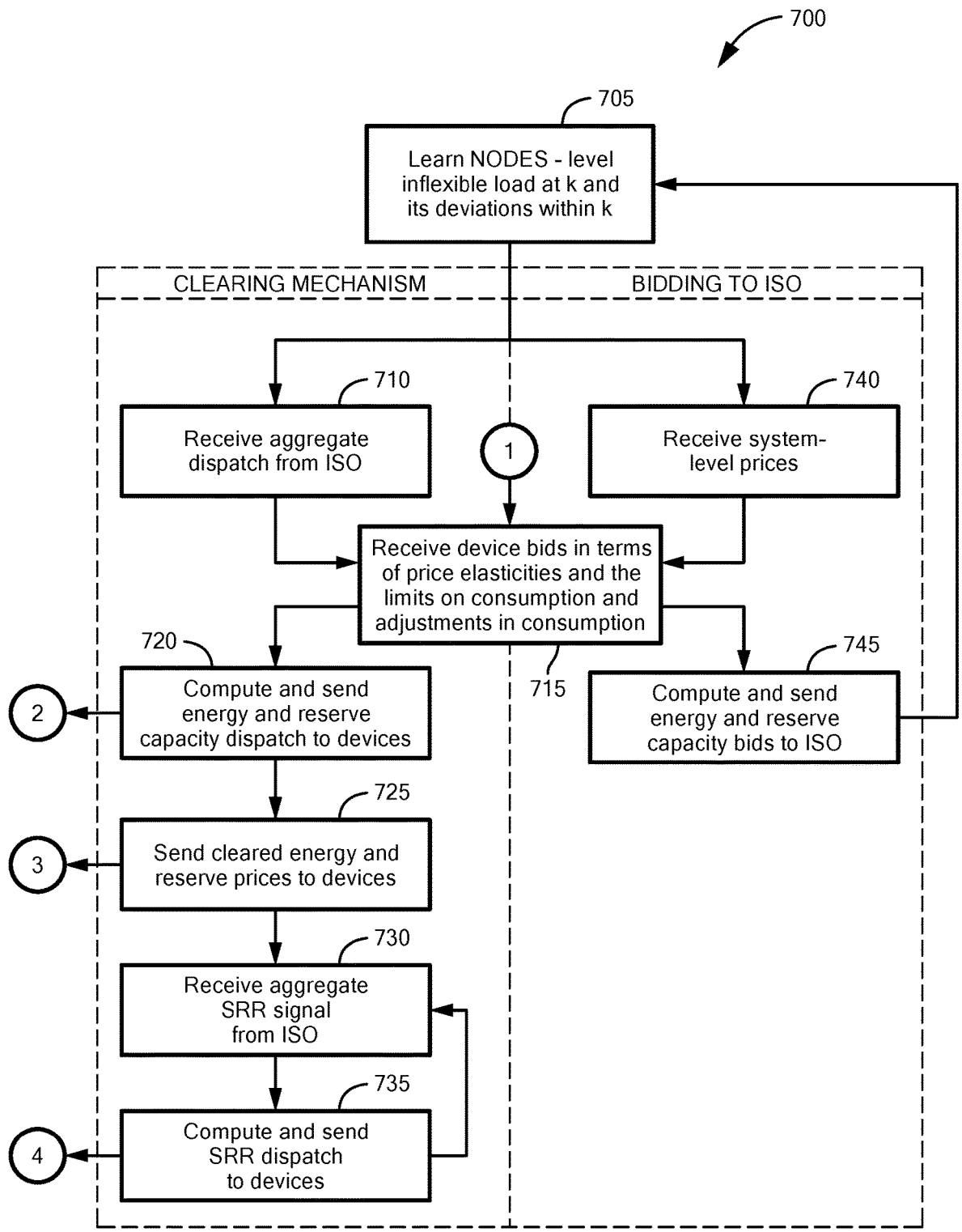
FIGS. 7-7A are flow diagrams of another method for provisioning synthetic regulation reserve (SRR) using distributed energy resources (DERs), by taking into explicit consideration physical characteristics of SRR devices, its price flexibility with respect to the generation/consumption adjustment and its limitations, according to example embodiments described herein.
Figure 7A:
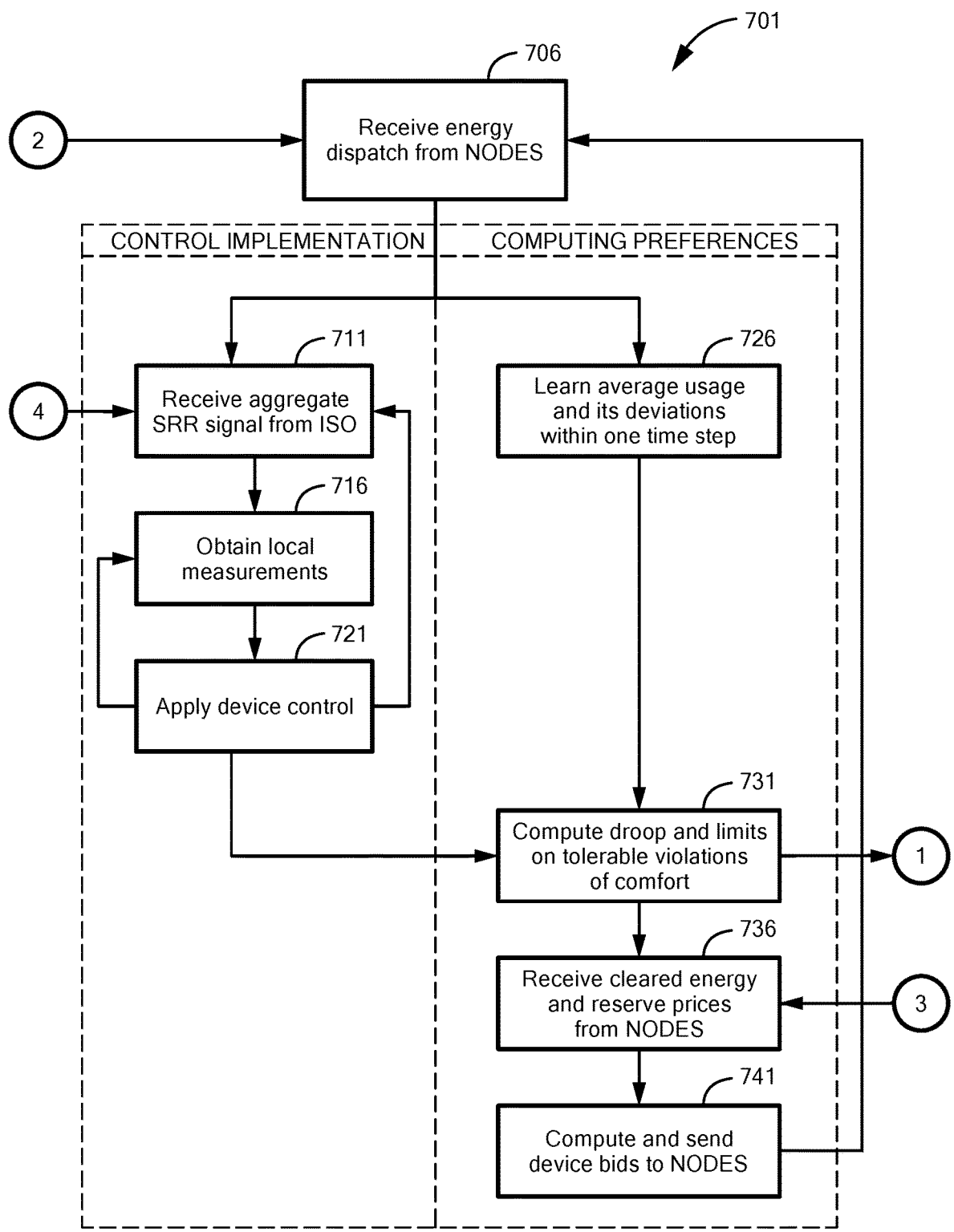

For context and without limitation, some embodiments of an electric energy system (e.g., the system 100 of FIG. 1) can comprise three hierarchies with SRR device systems (e.g., the systems 140*a-n* and 300 of FIGS. 1 and 3, respectively) on the lower most layer interacting with NODES (e.g., the NODES 135*a-n* of FIG. 1) in the middle layer, several of which interact ultimately with an ISO (e.g., the ISO 120 of FIG. 1) in the uppermost layer. FIGS. 5, 6 and 7 represent example implementations of a middle layer where NODES coordinators exist. FIGS. 5A, 6A and 7A represent example implementations of the lowest layer SRR device systems interacting with respective DERs in the physical layer.

FIGS. 5 and 5A corresponds to example methods referred herein as method 500 and 501 respectively, which are embedded in NODES and SRR device systems respectively. FIG. 5 is a flow diagram of a method 500 performed by NODES (e.g., NODES 135 of FIG. 1) comprising an SRP system (e.g., the SRP System 200 of FIG. 2) for provisioning energy and synthetic regulation reserve (SRR) by utilizing the provisioned energy and SRR by the ISO to then distribute among the DERs. At 505, the method 500 predicts uncontrollable DER energy consumption and the bounds on the deviations from predicted values. (e.g., using the load prediction processor 215 of FIG. 2). For example, energy consumption values are predicted using the following equation(s):

$$\hat{P}_i[k+1] = \phi_i P_i[k] + \phi_{ij} P_j[k] + \gamma_i P_i[k-d] + \gamma_{ij} P_j[k-d]$$

where $P_i[k]$ is present power consumption of uncontrolled DER, indexed by i at time sample k; $\hat{P}_i[k+1]$ is estimated future power consumption of uncontrolled DER indexed by i at time sample (k+1); $P_i[k-d]$ is power consumption of uncontrolled DER indexed by i previous day; $\phi_i$ is the correlation factor with respect to previous time instant consumption of DER i; $\phi_{ij}$ is the correlation factor with respect to previous time instant consumption of DER j; $\gamma_i$ is the correlation factor with respect to consumption of DER i, the previous day; and $\gamma_{ij}$ is the correlation factor with respect to consumption of DER j, the previous day.

At 510, the method 500 includes receiving the energy dispatch signals from. from an ISO (e.g., the ISO 120 of FIG. 1) through upper hierarchy SRP Module interface 240 in FIG. 2. At 512, the method 500 includes receiving energy consumption data from DERs (e.g., the DERS 145 of FIG. 1) through lower hierarchy SRP Module interface 205 in FIG. 2. At 515, the method 500 includes receiving an aggregate SRR signal from the ISO. This is the signal that the aggregate of DERs are supposed to track in response to fast supply-demand imbalances as seen by the ISO. At 520, the method 500 includes receiving a charge request from one or more DERs (e.g., see FIG. 5A step 556). At 525, the method 500 includes provisioning energy resources for one or more DERs. For example, the method 500 includes coordinating the DERs based on the present operating conditions and the queue wait times of DERs. The DERs charge requests may not be served immediately and resultantly the DERs are queued by the NODES, serving which may incur some lag time between the request and the service time, which is referred to as the wait time. The operating conditions can include current energy consumption, current SRR levels, ON/OFF state, device-specific ones such as the temperature in TCLs or SOC in EVs or batteries. The method 500, at 530, includes controlling the DERs based on the coordination step in 525. For example, the method 500 can include sending ON/OFF signals to the DERs.

At 540, the method 500 includes receiving energy prices as found by the ISO, for example. The method, at 545, uses the consumption data received at step 512 to learn DER consumption patterns. At 550, the method 500 using the energy prices and learned consumption patterns, includes forecasting future prices and then determining and sending energy and reserve capacity bids to the ISO.

FIG. 5A is a flow diagram of a method 501 performed by an SRR device system (e.g., the system 300 of FIG. 3) communicating with NODES performing the method 500 of FIG. 5. At 506, the method 501 includes measuring a DERs' energy usage. At 516, if the DER is not presently consuming energy, the method 501 continues measuring the DERs energy usage until energy usage is detected. At 521, the method 501 includes measuring a user's comfort metric 'W' associated with the DER. Comfort metric is a quantity used to define the physical quantities of interest to consumer ultimately. For example, the hot water consumption in electric water heaters, the state-of-charge requirements for meeting the driving schedules in EVs. The method 501, at 531, includes determining if the user's comfort preferences has changed. If comfort preferences have changed, the method 501, at 526, updates preferred and worst-case limits on the comfort metric 'W'. For example, the limits may be dictated by the permissible temperature deviations from a reference values, both of which can be set by the consumer through the thermostats in TCLs. At 536, the method 501 includes receiving power control signals from a NODES (e.g., see step 530 of FIG. 5). At 541, the method 501 includes determining if the present values of comfort are outside of user's comfort preferences. If not, the method continues to monitor energy usage. If they are lower than the preferred values, the method 501, at 551, checks if power control signal is ON. If not, it sends the signals to NODES to be switched ON. If at 561, the comfort metrics are seen to violate the lowest tolerable values, the device is switched ON overriding the signals from NODES. Alternatively, at 541, if the method 501 measures the comfort to be higher than the preferred values, the power control signal is checked for at 551. If it is ON, at 566, it sends signals to NODES requesting to be switched OFF, such that operation of the DER is not outside the user's comfort preferences. If the method 501, at 561 notices comfort metrics to be beyond the lowest permissible value, the device is switched OFF at 566, overriding the signals from NODES, though a suitable controller (e.g. the SRR controller 320 in FIG. 2).

The methods 500 and 501 embedded in SRP module and SRR device system together is one way of enabling synthetic reserve provisioning system shown in FIG. 1. The approach is suitable for a system which utilizes current logic of device controllers. The SRR provisioning is attempted through fast communication with devices and it may work when SRPS is coordinating very large number of SRR devices. An advantage of this approach is the simplicity of the decision-making algorithms and being able to utilize existing device controllers. However, meeting the performance specifications identified in FIG. 4 is contingent upon how large is the number of devices participating SRP. Typically, the stochastic nature of the device consumption patterns would require a very large number of DERs (of order of thousands) for providing non-negligible values of SRR supply as seen by the ISO.

FIG. 6 is a flow diagram of a method 600 performed by NODES (e.g., NODES 135 of FIG. 1) comprising an SRR provision system (e.g., the SRPS 200 of FIG. 2) for provisioning synthetic regulation reserve (SRR). At 605, the method 600 includes predicting energy loads (e.g., using the load prediction processor 215 of FIG. 2). For example, energy loads are predicted using the equation(s) described for the processor block 505 in method 500 as shown in FIG. 5, except that the time samples of predictions in block 605 can be much slower than the ones utilized in block 505. This is fundamentally because of the embedded novel automation (e.g. the SRR controller 320 in FIG. 3), described herein more detail.

At 610, the method 600 includes included receiving the scheduled values of aggregate power consumption as computed by ISO (For e.g., by the Energy Provisioning processor 225 of FIG. 2 of SRP embedded in ISO). At 615, the method 600 includes receiving DER device droops and user comfort metrics (e.g., comfort limits and any changes thereto). The device droops are input-output relations that is a linear quasi-static characterization of the change in end-use comfort as a function of change in input electrical power after the internal novel automation has been applied.

At 620, the method 600 includes determining and sending energy and reserve capacity dispatch signals to DERs. The reserve capacity is defined as the maximum generation/consumption adjustments the SRR devices or their aggregate devices must supply within the market clearing intervals. For example, the equations utilized for computing the energy and reserve capacity dispatch signals to be sent to SRR devices are:

$$\min_{\Delta P_{Di}[k], B_{Di}[k]} \sum_{k=1}^{H_t} \left[ \sum_{i \in I} \lambda_e^S[k] P_{Di}[k] - \lambda_r^S[k] B_{Di}[k] \right]$$

Energy Balance:

$$\Delta P_{DI}[k] - \sum_{i \in I} \Delta P_{Di}[k] - \Delta \hat{P}_I^u[k] = 0$$

Reserve requirement $$B_{DI}[k] - \sum_{i \in I} B_{Di}[k] - \hat{B}_I^u[k] \geq R^{margin}$$

Limits on energy:

$$\Delta P_{Di}^{min}[k] \leq \Delta P_{Di}[k] \leq \Delta P_{Di}^{max}[k]$$

-continued

Limits on reserve:

$$B_{Di}^{min}[k] \leq B_{Di}[k] \leq B_{Di}^{max}[k]$$

$$\forall i \in I, \forall k \in [1, H_t]$$

where $P_{Di}[k]$, $B_{Di}[k]$ is energy consumption and reserve capacity of DER i at time sample k evolving every market clearing time step $T_t$; $P_{DI}[k]$, $B_{DI}[k]$ is aggregate energy consumption and reserve capacity dispatch of NODES I within system S at time sample k; $\hat{P}_I^u[k]$, $\hat{B}_I^u[k]$ are estimations of consumption and bounds on its prediction error of uncontrolled DER l within NODE I at time sample k; $\lambda_e^S[k]$, $\lambda_r^S[k]$ are cleared prices for energy and reserves within system S at time sample k; $R^{margin}$ is the margin of safety which relates to how conservatively a coordinator prefers to over-schedule procuring additional reserve capacity within the NODES; $\Delta P_{Di}^{min}[k]$, $\Delta P_{Di}^{max}[k]$ are the permissible minimum and maximum consumption adjustments; $B_{Di}^{min}[k]$, $B_{Di}^{max}[k]$ are the permissible minimum and maximum bounds on reserve capacity that the device i is willing to provide; $H_t$ is the horizon length dictating the number of future time-steps that are taken into consideration prior to making the decisions at present time-step; and variables appended with $\Delta$ correspond to increments over the present operating values, unless otherwise stated.

The method 600, at 625, further includes receiving an aggregate SRR signal from the ISO within the market clearing interval. Aggregate SRR signal is the net power consumption adjustment that the aggregate of DERs coordinated by NODES in this example are supposed to deliver to the grid. This signal is computed by the ISO in this example by predicting the deviations of generation and consumption from market-cleared values or more precisely from the solutions obtained by solving the problem at 620 in method 600. At 630, the method 600 includes splitting the aggregate SRR signal into the ones that SRR devices connected to the NODES via communication network in this example, must deliver. The decision-making is such that the SRR device signals are below the reserve capacity dispatch as computed in 620 over longer time-frames. For example, the short time-frame aggregate SRR signal is split into device-specific SRR signals using the following equations:

$$\min_{\Delta P_{Di}[n]} \sum_{nT_s=(k-1)T_t}^{nT_s=kT_t} \left[ \sum_{i \in I} \lambda_e^S[k] P_{DI}[n] + \lambda_e^S[k] \left( -\sum_{i \in I} \Delta P_{Di}[n] \right) \right]$$

Energy balalnce over fast time scale:

$$\Delta P_{DI}[n] - \sum_{i \in I} \Delta P_{Di}[n] - \Delta \hat{P}_I^u[n] = 0$$

Bounds on fast adjustments:

$$|\Delta P_{Di}[n]| \leq B_{Di}[k]$$

$$\forall i \in I, \forall n \mid nT_s \in [(k-1)T_t, kT_t]$$

where $P_{Di}[n]$—Energy consumption of DER i at time sample n evolving every SRR computation time step $T_s$; $B_{Di}[k]$—Resereve capacity dispatch of DER i at time sample k evolving every market clearing time step $T_t$; $P_{DI}[k]$—Aggregate energy consumption dispatch of NODES I within system S at time sample k; $\hat{P}_I^u[n]$—Estimations of consumption of uncontrolled DERs within NODE I at time sample n;

$\lambda_e^S[k]$—Cleared prices for energy within system S at time sample k; and variables appended with $\Delta$ correspond to increments over the present operating values, unless otherwise stated.

At 635, the method 600 includes receiving energy prices such as system level prices. System level prices are the cleared prices obtained as a result of computations performed by the dispatch algorithm at ISO (For example, computation 625 in the method 600 when SRPS is embedded in ISO), Using the system level prices, device droop, and comfort data of steps 615 and 635, the method 600, at 640, includes computing and sending and energy reserve capacity bids to the ISO. As an example, the equations involved in such computation are:

$$\min_{\Delta P_{DI}[k], B_{DI}[k]} \sum_{k=1}^{H_t} \lambda_e^S[k] P_{DI}[k] - \lambda_r^S[k] B_{DI}[k]$$

Aggregate energy limits $$\sum_{i \in I} \Delta P_{Di}^{min}[k] \leq \Delta P_{DI}[k] - \Delta \hat{P}_I^u[k] \leq \sum_{i \in I} \Delta P_{Di}^{max}[k]$$

Aggregate reserve limits $$\sum_{i \in I} B_{Di}^{min}[k] \leq B_{DI}[k] - \hat{B}_I^u[k] \leq \sum_{i \in I} B_{Di}^{max}[k] \; \forall \, k \in [1, H_t]$$

where $P_{DI}[k], B_{DI}[k]$—Aggregate energy consumption and reserve capacity dispatch of NODES I within system S at time sample k; $\hat{P}_I^u[k], \hat{B}_I^u[k]$—Estimations of consumption and bounds on its prediction error of uncontrolled DER 1 within NODE I at time sample k; $\lambda_e^S[k], \lambda_{rf}^S[k]$—Cleared prices for energy and reserves within system S at time sample k; $\Delta P_{Di}^{min}[k], \Delta P_{Di}^{max}[k]$ are the permissible minimum and maximum consumption adjustments; $B_{Di}^{min}[k], B_{Di}^{max}[k]$ are the permissible minimum and maximum bounds on reserve capacity that the device i is willing to provide; and $H_t$ is the horizon length dictating the number of future time-steps that are taken into consideration prior to making the decisions at present time-step.

FIG. 6A is a flow diagram of a method 601 performed by an SRR device systems (e.g., the system 300 of FIG. 3) communicating with NODES performing the method 600 of FIG. 6.

At 606, the method 601 includes receiving energy dispatch from the NODES operator referred to in FIG. 6. (see, e.g., step 620 of FIG. 6). The method 601, at 611, includes receiving an aggregate SRR signal (e.g., see step 630 of FIG. 6). Using sensors (e.g., the sensors 310 of FIG. 3), the method 601, at 616, includes obtaining local measurements such as energy usage, comfort-related quantities such as fluid temperature in TCLs or SOC in EVs, The method 601, at 621, controls the DER to which the SRR device systems is attached based on the signals received from steps 611 and 616. Further, the method 601, at 626, includes determining the DER's average energy usage and any deviations from the average during a time block. The method 601, at 631, then computes and sends device droop data and comfort limits data to the NODES (see, e.g., step 615 of FIG. 6). An example of novel automation that can be embedded in water heaters is shown below:

$$P_W(t) = -g_\theta(\theta_W(t) - \theta_W^{ref}[n]) - C_p \Delta \dot{m}(t) \theta_W(t) + P_W^{ref}[k]$$

where $P_W(t)$—Electrical power input to the water heater at any time t; $\theta_W(t)$—Water temperature at any time t; $\theta_W^{ref}[n]$—Temperature setpoint adjustments at sample numbers n evolving every $T_s$ time corresponding to SRR singal implementation; $g_\theta$—Control gain corresponding to temperature adjustment; $C_p$—Specific heat of water; $\Delta \dot{m}(t)$—Deviations of the water usage from the predicted values; $P_W^{ref}[k]$—Slower feed-forward component of electrical input at sample number k evolving every $T_t$ corresponding to bid creation time-frames.

Such a control when applied, results in a linear input-output relation between the electrical input $P_W$ and the output of interest being the comfort metrics W, which in this example is defined as the product of water flow rate and the temperature of water denoting the hot water usage. Mathematically this relation is given over longer time-frames as $$\Delta W_W[k] = \sigma_W \Delta P_W[k]$$

where $\Delta W_W[k]$—consumer comfort increment over two consecutive time samples evolving at $T_t$; $\Delta P_W[k]$—electrical input increment over two consecutive time samples evolving at $T_t$ $\sigma_W$—Water heater droop, which is numerically equal to $C_p^{-1}$ for the example of water heater.

Similar quasi-static relations can be constructed for any device undergoing energy conversion from one from to another and is referred to as the device-specific droops. The limits on the comfort W as dictated by the the internal variables and the electrical input limitations together can be utilized to compute limits on tolerable power consumption adjustments.

In comparison to the method 500 and 501, the method 600 and 601 embedded in SRP Module and SRR device systems respectively result in much slower communication between different hierarchical layers. Furthermore, the novel automation in method 601, ensures implementation of the aggregate bid committed by SRP Module in method 600. The downside of this method however is that the large number of DERs which when coordinated by SRP Module may result in higher computational complexity. In addition, the SRR devices are mere price takers, resulting in lack of strong incentives for encouraging the adoption of smarter control.

FIG. 7 is a flow diagram of another method 700 performed by NODES (e.g., NODES 135 of FIG. 1) comprising an SRP Module (e.g., the SRP Module 200 of FIG. 2) for provisioning synthetic regulation reserve (SRR). At 705, the method 700 includes predicting energy loads (e.g., using the load prediction processor 215 of FIG. 2). For example, energy loads are predicted using the equation(s) described for the processor block 505 in method 500 as shown in FIG. 5, except that the time samples of predictions in block 705 can be much slower than the ones utilized in block 505. This is fundamentally because of the embedded novel automation (e.g. the SRR controller 320 in FIG. 3), described herein more detail. At 710, the method 700 includes receiving the scheduled values of aggregate power consumption as computed by ISO (For e.g., by the Energy Provisioning processor 225 of FIG. 2 of SRP embedded in ISO). At 715, the method 700 includes receiving DER device bids in terms of price elasticities and the tolerable limits on power consumption and ability to provide reserves. The device bids are continuous linear functions of power consumption as a function of prices, depicting willingness of consumers to buy energy as a function of price. For example, lower is the energy price, higher shall be the consumption of the devices if the comfort limits are not violated. Such price-dependent relations of power consumption and the resulting time-varying limits on the average consumption and the rate at which it can change is communicated in the form of price bids. At 720, the method 700 includes determining and sending energy and reserve capacity dispatch to DERs. The reserve capacity is defined as the maximum generation/consumption adjustments the SRR devices or their aggregate devices must supply within the market clearing intervals. For example, the equations utilized for computing the energy and reserve capacity dispatch signals to be sent to SRR devices are:

$$\min_{\Delta P_{Di}[k], B_{Di}[k]} \sum_{k=1}^{H_t} \left[ \sum_{i \in I} C_i^e(P_{Di}[k]) + C_i^r(B_{Di}[k]) \right]$$

Energy Balance:

$$\Delta P_{DI}[k] - \sum_{i \in I} \Delta P_{Di}[k] - \Delta \hat{P}_I^u[k] = 0$$

Reserve requirement $$B_{DI}[k] - \sum_{i \in I} B_{Di}[k] - \hat{B}_I^u[k] \geq R^{margin}$$

Limits on energy:

$$\Delta P_{Di}^{min}[k] \leq \Delta P_{Di}[k] \leq \Delta P_{Di}^{max}[k]$$

Limits on reserve:

$$B_{Di}^{min}[k] \leq B_{Di}[k] \leq B_{Di}^{max}[k]$$

$$\forall i \in I, \forall k \in [1, H_t]$$

where $C_i^e$, $C_i^r$—Energy and reserve capacity bids of DER i connected to NODES I via the network; $P_{Di}[k]$, $B_{Di}[k]$—Energy consumption and reserve capacity of DER i at time sample k evolving every market clearing time step $T_t$; $P_{DI}[k]$, $B_{DI}[k]$—Aggregate energy consumption and reserve capacity dispatch of NODES I within system S at time sample k; $\hat{P}_I^u[k]$, $\hat{B}_I^u[k]$—Estimations of consumption and bounds on its prediction error of uncontrolled DER 1 within NODE I at time sample k; $\lambda_e^S[k]$, $\lambda_r^S[k]$—Cleared prices for energy and reserves within system S at time sample k; $R^{margin}$ is the margin of safety which relates to how conservatively a coordinator prefers to over-schedule procuring additional reserve capacity within the NODES; $\Delta P_{Di}^{min}[k]$, $\Delta P_{Di}^{max}[k]$ are the permissible minimum and maximum consumption adjustments; $B_{Di}^{min}[k]$, $B_{Di}^{max}[k]$ are the permissible minimum and maximum bounds on reserve capacity that the device i is willing to provide; $H_t$ is the horizon length dictating the number of future time-steps that are taken into consideration prior to making the decisions at present time-step; and variables appended with Δ correspond to increments over the present operating values, unless otherwise stated.

The method 700, at 725, also includes sending cleared energy and reserve prices from bids of step 745. At 730, the method 700 includes receiving an aggregate SRR signal from the ISO. Aggregate SRR signal is the net power consumption adjustment that the aggregate of DERs coordinated by NODES in this example are supposed to deliver to the grid. This signal is computed by the ISO in this example by predicting the deviations of generation and consumption from market-cleared values. At 735, the method 700 includes determining and sending SRR dispatch to DERs.

For example, the short time-frame aggregate SRR signal is split into device-specific SRR signals using the following equations:

$$\min_{\Delta P_{Di}[n]} \sum_{nT_s=(k-1)T_t}^{nT_s=kT_t} \left[ \sum_{i \in I} C_i^e(P_{Di}[n]) + \lambda_e^I[k] \left( -\sum_{i \in I} \Delta P_{Di}[n] \right) \right]$$

Energy balalnce over fast time scale:

$$\Delta P_{DI}[n] - \sum_{i \in I} \Delta P_{Di}[n] - \Delta \hat{P}_I^u[n] = 0$$

Bounds on fast adjustments:

$$|\Delta P_{Di}[n]| \leq B_{Di}[k]$$

$$\forall i \in I, \forall n \mid nT_s \in [(k-1)T_t, kT_t]$$

where $P_{Di}[n]$—Energy consumption of DER i at time sample n evolving every SRR computation time step $T_s$; $B_{Di}[k]$—Resereve capacity dispatch of DER i at time sample k evolving every market clearing time step $T_t$; $P_{DI}[k]$—Aggregate energy consumption dispatch of NODES I within system S at time sample k; $\hat{P}_I^u[n]$—Estimations of consumption of uncontrolled DERs within NODE I at time sample n; $\lambda_e^S[k]$—Cleared prices for energy within system S at time sample k; and variables appended with Δ correspond to increments over the present operating values, unless otherwise stated.

The method 700, at 740, includes receiving energy prices such as system level prices. System level prices are the cleared prices obtained as a result of computations performed by the dispatch algorithm at ISO (For example, computation 625 in the method 600 when SRPS is embedded in ISO). Using the system level prices, device droop, device bids, and comfort data of steps 715 and 740, the method 700, at 740, includes computing and sending and energy reserve capacity bids to the ISO. The equations involved in such computation for example as shown below:

$$\min_{\Delta P_{DI}[k], B_{DI}[k]} \sum_{k=1}^{H_t} \lambda_e^S[k] P_{DI}[k] - \lambda_r^S[k] B_{DI}[k]$$

Aggregate energy limits $$\sum_{i \in I} \Delta P_{Di}^{min}[k] \leq \Delta P_{DI}[k] - \Delta \hat{P}_I^u[k] \leq \sum_{i \in I} \Delta P_{Di}^{max}[k]$$

Aggregate reserve limits $$\sum_{i \in I} B_{Di}^{min}[k] \leq B_{DI}[k] - \hat{B}_I^u[k] \leq \sum_{i \in I} B_{Di}^{max}[k] \quad \forall k \in [1, H_t]$$

where $P_{DI}[k]$, $B_{DI}[k]$—Aggregate energy consumption and reserve capacity dispatch of NODES I within system S at time sample k; $\hat{P}_I^u[k]$, $\hat{B}_I^u[k]$—Estimations of consumption and bounds on its prediction error of uncontrolled DER 1 within NODE I at time sample k; $\lambda_e^S[k]$, $\lambda_r^S[k]$—Cleared prices for energy and reserves within system S at time sample k; $\Delta P_{Di}^{min}[k]$, $\Delta P_{Di}^{max}[k]$ are the permissible minimum and maximum consumption adjustments; $B_{Di}^{min}[k]$, $B_{Di}^{max}[k]$ are the permissible minimum and maximum bounds on reserve capacity that the device i is willing to provide; $H_t$ is the horizon length dictating the number of future time-steps that are taken into consideration prior to making the decisions at present time-step; and variables appended with Δ correspond to increments over the present operating values, unless otherwise stated.

FIG. 7A is a flow diagram of a method 701 performed by an SRR device systems (e.g., the controller 300 of FIG. 3) communicating with NODES performing the method 700 of FIG. 7.

At 706, the method 701 includes receiving energy dispatch from the NODES referred to in FIG. 7. (see, e.g., step 720 of FIG. 7). The method 701, at 711, includes receiving an aggregate SRR signal (e.g., see step 735 of FIG. 7). Using sensors (e.g., the sensors 310 of FIG. 3), the method 700, at 716, includes obtaining local measurements such as energy usage, comfort-related quantities such as the fluid temperature in TCLs or SOC in EVs. The method 701, at 721, controls the DER to which the SRR device systems is attached based on the signals received from steps 711 and 716. Further, the method 701, at 726, includes determining the DER's average energy usage and any deviations from the average during a time block. The method 701, at 731, then computes device energy and reserve bids upon receiving cleared energy and reserve prices (e.g., see step 725 of FIG. 7). As an example, the equations utilized for computing bid functions of DERs are shown below:

$$\min_{P_{Di}[k], B_{Di}[k]} \sum_{k=1}^{H_t} \lambda_e^I[k] P_{Di}[k] - \lambda_r^I[k] B_{Di}[k]$$

DER-droop relation in closed loop:

$$\Delta P_{Di}[k] = \sigma_i \Delta W_i[k]$$

Comfort limits $$\Delta W_i^{min}[k] \leq \Delta W_i[k] \pm \frac{B_{Di}}{\sigma_i} \leq \Delta W_i^{max}[k]$$

Limits on rate of change of comfort $$\dot{W}_i^{min}[k] T_t \leq \Delta W_i[k] \pm \frac{B_{Di}}{\sigma_i} \leq \dot{W}_i^{max}[k] T_t$$

where $P_{Di}[k]$, $B_{Di}[k]$—Energy consumption and reserve capacity dispatch of DER i connected to the NODES I, through the network, at time sample k evolving every market-clearing time-step $T_t$; $\lambda_e^I[k]$, $\lambda_r^I[k]$—Cleared prices for energy and reserves of NODES I at time sample k; $\Delta W_i^{min}[k]$, $\lambda W_i^{max}[k]$ are the permissible minimum and maximum comfort values; $\dot{W}_i^{min}[k]$, $\dot{W}_i^{max}[k]$ are the permissible minimum and maximum rates at which comfort values can vary; $\sigma_i$ is the energy conversion device-specific droop of SRR device i; $H_t$ is the horizon length dictating the number of future time-steps that are taken into consideration prior to making the decisions at present time-step; and variables appended with $\Delta$ correspond to increments over the present operating values, unless otherwise stated.

Additionally, the method 701, at 741, includes computing and sending device bids to the NODES operator. All the advantages that have been seen for incorporating methods 600 and 601 shall hold for the methods 700 and 701 embedded in NODES operator and SRR device systems respectively. In addition, the additional functionality within the SRR device systems to also submit the bid functions (E.g., Energy bidding processor 340 in FIG. 3 activated at step 741 in method 701) makes them price-makers. This added functionality may even result in stronger incentive for adoption of smarter device automation ultimately. Furthermore, the decision-making of the coordinator tends to be less complicated, thus resulting in obtaining a totally implementable SRR provisioning at value.

The above-described systems and methods can be implemented in digital circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A synthetic regulation reserve (SRR) provisioning (SRP) system (SRPS) comprising:
    an energy supply monitoring system configured to receive energy supply data from an electrical grid;
    a load prediction processor coupled to the energy supply monitor, said load prediction processor responsive to signals provided thereto and configured to provide a prediction of future energy load needs;
    an energy bidding and pricing prediction processor coupled to the load prediction processor and the energy supply monitoring system, the energy bidding and pricing prediction processor configured to bid for energy based at least on the predicted future energy load needs; and
    an energy provisioning processor coupled to the energy supply monitoring system, load prediction processor, and energy bidding and pricing prediction processor, the energy provisioning processor configured to provide a provisioning signal that controls a schedule, supply, and dispatch of synthetic regulation reserves (SRRs) corresponding to one or more distributed energy resources (DERs), wherein the dispatch is always based upon bids provided by said energy bidding and pricing prediction processor.

2. The system of claim 1 further comprising:
    a network interface configured to enable the SRP system to communicate with one or more decision-making agents to provision SRR in a hierarchy of decision-making agents.

3. The system of claim 2 further comprising:
    a lower hierarchy SRP module interface communicatively coupled to one or more SRR device systems via the network interface, the lower hierarchy SRP module interface configured to aggregate energy consumption-related data of one or more lower hierarchy decision-making agents; and
    an upper hierarchy module interface communicatively coupled to one or more upper hierarchy decision-making agents via the network interface, the upper hierarchy module interface configured to receive information about aggregate energy consumption and associated prices from the upper hierarchy decision-making agents.

4. The system of claim 3, wherein the load prediction processor is further configured to provide a prediction of future energy load needs based on the aggregate energy consumption-related data of the one or more lower hierarchy decision-making agents.

5. The system of claim 3, wherein the energy bidding and pricing prediction processor is further configured to:
    bid for energy based at least on the aggregate energy consumption-related data of the one or more lower hierarchy decision-making agents; and
    implement a predictive based model capable of controlling one or more DERs to perform an energy storing operation such that the DERs remain switched ON at a point in time when the electrical grid is not in need and switched OFF at a point in time when the electrical grid is in need so as to cut down on energy consumption, wherein said energy storing operation corresponds to a pre-heating operation.

6. The system of claim 1 further comprising a grid interface coupled to the energy supply monitoring system, the grid interface configured to interface with a physical layer of the electrical grid and receive energy supply data from one or more power generators.

7. The system of claim 1 wherein the DERs comprise a water heater, an air heater, a controllable appliance, a controllable household device, and/or an electric vehicle.

8. A synthetic regulation reserve (SRR) control system comprising:
    an SRR controller configured to provide one or more control signals to one or more distributed energy resources (DERs);

one or more sensors, each of the one or more sensors coupled to the one or more DERs, each of said sensors configured to determine one or more energy characteristics of the one or more DERs; and a usage prediction processor coupled to the one or more sensors, the usage prediction processor configured to determine future energy requirements of the one or more DERs.

9. The system of claim 8 further comprising an SRR device interface configured to communicatively couple with the one or more DERs such that the SRR controller can provide the one or more control signals to the one or more DERs.

10. The system of claim 8 further comprising:
a network interface communicatively coupled to a synthetic regulation reserve provisioning (SRP) system (SRPS), the network interface configured to receive control signals from the SRP system;
an energy bidding processor configured to compute DER level energy bids based on the one or more energy characteristics and the determined future energy requirements;
an SRP system interface coupled to the network interface and the energy bidding processor, the SRP system interface configured to couple the control signals and the DER level energy bids to the SRR controller.

11. The system of claim 8 further comprising a memory configured to store the energy characteristics of the one or more DERs.

12. A system comprising:
an electrical power grid;
one or more power generators coupled to the electrical power grid;
one or more distributed energy resources (DERs) coupled to the electrical power grid;
one or more synthetic regulation reserve (SRR) device control systems coupled to the one or more DERs;
a hierarchy of energy decision-making agents configured to distribute energy from the electrical power grid to an end user; and
a synthetic regulation reserve provisioning (SRP) system (SRPS) configured to provide a provisioning signal that controls a schedule, supply, and dispatch of SRR corresponding to one or more distributed energy resources (DERs).

13. The system of claim 12, wherein the one or more DERs comprise one or more of:
chemical loads, electrical loads, and thermostatically controlled loads (TCLs).

14. The system of claim 13, wherein:
the electrical loads comprise at least one or more of: electric vehicles (EVs) and batteries; and
the TCLs comprise at least one or more of: water heaters, air conditioners, and heating, ventilation, and air conditioning (HVAC) systems.

15. The system of claim 14, wherein the chemical and electrical loads define their SRR based on the load's state of charge (SOC).

16. The system of claim 15, wherein the TCLs define their SRR based on the load's thermal energy stored in a fluid, wherein the fluid comprises at least one or more of: air and water.

17. The system of claim 12, wherein the SRP system comprises:
an energy supply monitoring system configured to receive energy supply data from the electrical grid;
a load prediction processor coupled to the energy supply monitor, said load prediction processor responsive to signals provided thereto and configured to provide a prediction of future energy load needs;
an energy bidding and pricing prediction processor coupled to the load prediction processor and the energy supply monitoring system, the energy bidding and pricing prediction processor configured to bid for energy based at least on the predicted future energy load needs; and
an energy provisioning processor coupled to the energy supply monitoring system, load prediction processor, and energy bidding and pricing prediction processor, the energy provisioning processor configured to provide a provisioning signal that controls a schedule, supply, and dispatch of SRR corresponding to one or more distributed energy resources (DERs), wherein the dispatch is always based upon bids provided by said energy bidding and pricing prediction processor.

18. The system of claim 17, wherein the SRP system further comprises:
a network interface configured to enable the SRP system to communicate with one or more decision-making agents to provision SRR in a hierarchy of decision-making agents.

19. The system of claim 18, wherein the SRP system further comprises:
a lower hierarchy SRP module interface communicatively coupled to one or more SRR device systems via the network interface, the lower hierarchy SRP module interface configured to aggregate energy consumption-related data of one or more lower hierarchy decision-making agents;
an upper hierarchy module interface communicatively coupled to one or more upper hierarchy decision-making agents via the network interface, the upper hierarchy module interface configured to receive information about aggregate energy consumption and associated prices from the upper hierarchy decision-making agents; and
a grid interface coupled to the energy supply monitoring system, the grid interface configured to interface with a physical layer of the electrical grid and receive energy supply data from one or more power generators.

20. The system of claim 12 further comprising a synthetic regulation reserve (SRR) control system comprising:
an SRR controller configured to provide one or more control signals to one or more distributed energy resources (DERs);
one or more sensors, each of the one or more sensors coupled to the one or more DERs, each of said sensors configured to determine one or more energy characteristics of the one or more DERs; and
a usage prediction processor coupled to the one or more sensors, the usage prediction processor configured to determine future energy requirements of the one or more DERs.

21. The system of claim 20, wherein the SRR control system further comprises:
an SRR device interface configured to communicatively couple with the one or more DERs such that the SRR controller can provide the one or more control signals to the one or more DERs;
an SRR network interface communicatively coupled to a synthetic regulation reserve provisioning (SRP) system, the network interface configured to receive control signals from the SRP system;

an energy bidding processor configured to compute DER level energy bids based on the one or more energy characteristics and the determined future energy requirements; and an SRP system interface coupled to the SRR network interface and the energy bidding processor, the SRP system interface configured to couple the control signals and the DER level energy bids to the SRR controller.

* * * * *

UNITED STATES PATENT AND TRADEMARK OFFICE
CERTIFICATE OF CORRECTION

PATENT NO. : 11,223,206 B2
APPLICATION NO. : 16/206009
DATED : January 11, 2022
INVENTOR(S) : Marija D. Ilic et al.

It is certified that error appears in the above-identified patent and that said Letters Patent is hereby corrected as shown below:

In the Specification

Column 1, Lines 15-17 delete "This invention was made with Government support under Grant No. FA8702-15-D-0001 awarded by the U.S. Air Force. The Government has certain rights in the invention." and replace with --This invention was made with government support under DE-AR0000747 awarded by the U.S. Department of Energy and FA8702-15-D-0001 awarded by the U.S. Air Force. The government has certain rights in the invention.--.

Signed and Sealed this
Seventh Day of February, 2023

Katherine Kelly Vidal
*Director of the United States Patent and Trademark Office*